US012616087B2

(12) United States Patent　　　　(10) Patent No.:　US 12,616,087 B2

Chrysanthakopoulos et al.　　　　(45) Date of Patent:　May 5, 2026

(54) SYSTEM FOR DEPREDATOR AND PREDATOR CONTROL USING A ROBOT AND SENSORY CONTROLLING APPARATUS

(71) Applicants: Georgios Chrysanthakopoulos, Seattle, WA (US); Dan Abramson, Fall City, WA (US)

(72) Inventors: Georgios Chrysanthakopoulos, Seattle, WA (US); Dan Abramson, Fall City, WA (US)

( * ) Notice: Subject to any disclaimer, the term of this patent is extended or adjusted under 35 U.S.C. 154(b) by 1126 days.

(21) Appl. No.: 17/114,170

(22) Filed: Dec. 7, 2020

(65) Prior Publication Data

US 2021/0084813 A1　　Mar. 25, 2021

Related U.S. Application Data

(63) Continuation-in-part of application No. 16/024,450, filed on Jun. 29, 2018, now Pat. No. 10,863,668.

(51) Int. Cl.
| | |
|---|---|
| *A01D 34/00* | (2006.01) |
| *A01M 21/04* | (2006.01) |
| *B25J 9/16* | (2006.01) |
| *G05D 1/00* | (2024.01) |

(52) U.S. Cl.
CPC ........... *A01D 34/008* (2013.01); *A01M 21/04* (2013.01); *B25J 9/1697* (2013.01); *G05D 1/0219* (2013.01)

(58) Field of Classification Search
CPC ..... A01D 34/008; A01M 21/04; B25J 9/1697; G05D 1/0219

USPC .......................................................... 701/50
See application file for complete search history.

(56) References Cited

U.S. PATENT DOCUMENTS

| | | | | |
|---|---|---|---|---|
| 2016/0100522 A1* | 4/2016 | Yamauchi | ............ | G05D 1/0219 |
| | | | | 701/25 |
| 2017/0067444 A1* | 3/2017 | Skelton | ................... | G09F 13/04 |
| 2018/0001474 A1* | 1/2018 | Sinyavskiy | ............ | B25J 9/1697 |
| 2018/0217593 A1* | 8/2018 | Erickson | ................ | G05D 1/104 |
| 2019/0069535 A1* | 3/2019 | Hauck, Jr. | ............ | A01M 29/10 |
| 2019/0246623 A1* | 8/2019 | Tews | ................... | A01M 31/002 |

FOREIGN PATENT DOCUMENTS

| | | | | | |
|---|---|---|---|---|---|
| BR | 102016006251 A2 | * | 7/2016 | ............ | A01B 39/28 |
| KR | 20170008489 A | * | 7/2015 | | |
| KR | 101752609 B1 | * | 11/2016 | | |
| WO | WO-2018006132 A1 | * | 1/2018 | ............ | A01M 29/00 |

* cited by examiner

*Primary Examiner* — Helal A Algahaim
*Assistant Examiner* — Patrick M Brady
(74) *Attorney, Agent, or Firm* — Apex Juris, pllc; Tracy M Heims

(57) ABSTRACT

This invention is a system to control depredators and predators having a configurable ground utility robot where the robot has an all-terrain autonomous mobile apparatus that can navigate in both structured and unstructured environments, a processor, at least one sensor that communicates with the processor, and at least one computer program that performs at least the following functions: receives and interprets data from the at least one sensor; controls the mobile apparatus; at least one control device; and where the ground utility robot is powered by renewable energy.

15 Claims, 24 Drawing Sheets

819

800

827

828

870

818

823

900

816

817

826

900

SYSTEM FOR DEPREDATOR AND PREDATOR CONTROL USING A ROBOT AND SENSORY CONTROLLING APPARATUS

RELATED APPLICATION

FIGS. 11-24 show a visual, tangible deterrent that is a Sky Puppet and the different ways and means of implementing the Sky Puppet with the robot. One specific type of visual, tangible, physical deterrent is an apparatus that visually threatens or scares a depredator or predator by its movement, such as a windsock, skypuppet, air puppet, sky dancer or variants thereof. Such devices are often used outdoors for advertising purposes (e.g., outside of car dealerships or other businesses and are used to advertise sales or special events). They can also be used as a stationary device, where the location of the base of the apparatus does not change, to scare birds and other predators. The prior art for such apparatuses typically includes an electrically driven motor 821, a fan 822 and a windsock 823 or skypuppet sock. The power drives the motor 821, the motor 821 turns the fan 822 and the fan 822 fills the windsock 823. The sock 823 then flops, moves, and dances around in order to, for example, attract customers or scare birds. The basic apparatus for the skypuppet 819 in the present invention is shown in FIGS. 11 through 24. It includes a motor 821, a fan 822 and the skypuppet windsock 823. The present invention incorporates the ground utility robot and adds constant moveability and roaming ability to the skypuppet 819. When attached to the robot 800 the skypuppet 819 moves as the ground utility robot moves, thus increasing the efficacy of the threat or scare because, for example, the distance or angle between the skypuppet 819 and the predator can be controlled.

FIELD OF THE INVENTION

The current invention relates to a robot system that can include an energy collection system, an energy supply docking system, autonomous cooperative robots, payloads or apparatus attachable to the autonomous robots to perform functions or tasks and a control company or means to oversee and control robot reservations, robot delivery, operation and retrieval, to control energy collection and dissemination, and general maintenance and control of the robot system. This invention also relates to a human assisted machine learning system whereby humans are used to help train the robots to learn or perform functions. Finally, it relates to using the robots as cooperative or collaborative units whereby the robots can be used in unison to perform tasks that an individual robot cannot perform; or to assist other robots when needed, such as when a robot gets stuck in a field and needs assistance with movement, or a task; or to take over when another robot runs out of charge or fails to perform for whatever reason.

The invention relates first to the field of autonomous, modular, ground utility robot units, or GURU, to perform tasks. Nothing currently exists that is truly similar to the embodiments disclosed herein. In one embodiment the GURU accepts attachments that perform tasks, such as snow removal. In another embodiment the GURU is capable of moving cargo around. In another embodiment the GURU accepts payloads, such as a focused energy apparatus attachment that utilizes focused energy beams or lenses to focus light to perform a variety of tasks, such as weed suppression and control, pest or insect control, crop harvesting, and predator control. In yet another embodiment the payload weed suppression attachment apparatus is a screw device that will eradicate or remove a weed. In all applications the systems preferably utilize clean sources of energy and the entire systems are made from recycled or easily recycled materials and parts.

The autonomous robot of the present invention relates to an autonomous, cooperative machine, in the form of a lightweight insectoid mobile robot, or in the form of a mobile wheeled robot, or any other type of mobile robot, that can be deployed in farms, fields or large open crop raising areas to control weeds, control pests, harvest crops, scare predators, monitor weather, monitor livestock health, monitor soil, aerate soil, provide security, move "stuff" around, transport cargo, or any of a variety of chores and tasks assigned to the robots.

Further, it is an autonomous robot system comprising an autonomous robot, allocation software that will allow a user to log onto a platform and enter information so that the control company can compile the information and then allocate the robots to the job. Once the robots are delivered to the job the system further has software that will allow the robot to navigate in either a structured or unstructured environment where the robot can perform a variety of tasks. It is also possible that there will be a system that can collect energy and utilize the energy either to run the robots on the work site or to use the energy to power robots at other proximate sites. Finally, it is an autonomous robot system that has the control company or means to deliver the robots to their jobs, to maintain the robots while at the job, to collect data, to collect energy when a site is so configured, and to generally oversee, run and maintain the entire robot system operation.

BACKGROUND INFORMATION

There is a great need to have robots assist in our daily lives. As technology moves forward it is now envisionable that robots can and will perform many of the tasks and chores that we as humans routinely perform in our daily lives. Already used abundantly in manufacturing, the personal "bot" has not quite made it into our lives much past the Roomba® cleaner by iRobot®. There are multitudes of applications for a mobile robot, including but not limited to room vacuuming, snow removal, transporter, ground aeration, plant watering, feeding and fertilizing, crop monitoring, weed control, pest control—both large and small (eliminating small bugs, along with scaring off larger predators) corn de-tasseling, crop harvesting (which might include picking beans, berries, apples, pears, grapes, etc.), grounds security, weather reporting, livestock surveillance and monitoring (for example, if an animal in the pasture is sick or injured the bot could report back to the farmer that there is a problem), debris cleanup and removal and a variety of other tasks and chores now performed manually by humans. Thus, there is a great need to have bots assist us in our daily lives.

It is clear from research that there is a great need to reduce weeds in order to protect food crops because weeds reduce yields due to the fact that they steal water, nutrients, and sunlight from food crops. This represents a significant challenge to all growers. One source states, "Currently, weed control is ranked as the number one production cost by organic and many conventional growers" see *Fundamentals of Weed Science*, 4th edition, Robert L. Zimdahl, page 308 incorporated herein by this reference. Furthermore, the weed problem is worsening as weeds become resistant to common herbicides. See https://en.wikipedia.org/wiki/Glyphosate incorporated herein by this reference.

Mechanical eradication of weeds could solve or at least minimize the problem of herbicide resistance. Accordingly, this strategy has been pursued by many. See, for example, http://www.bosch-presse.de/presseforum/details.htm?txtID=7361&tk_id=166, incorporated herein by this reference. The challenges are constructing cost-effective implements able to discriminate between weeds and desired crops and to find solutions to efficiently and economically remove weeds. In addition, mechanical weeding disturbs the soil, drying it out and actually encouraging weed growth by stimulating the weed seed bank. Purely mechanical methods are available commercially (see, e.g. http://www.lely.com/uploads/original/Turfcare_US/Files/WeederSpecSheet_FI-NAL.pdf, incorporated herein by this reference) but are limited in scope. Vision-based methods have not yet proven commercially successful possibly because of the great similarity between weeds and crops during some parts of the growth cycle. See also U.S. Published Patent Application Serial No. 2013/0345876 and U.S. Pat. Nos. 5,442,552 and 8,381,501 all incorporated herein by this reference.

There is also a great need to reduce and control pests. Insects routinely feast on plants, endangering crops and costing billions annually. By some estimates insects cost the US alone around $120 billion annually. Many of these damages are caused by insects that are not native to the US, but rather those that come in through travelers. However, unless we cease travel or cease raising crops, insects will continue to be an issue.

Next, there is a great need to find ways to harvest crops. Although we have many crops that are harvested using large machinery, there still exists many industries where crops are harvested by hand, including tomatoes, lettuce and spinach, cherries, apples, peppers, almond trees, and many other fruits and nuts.

There is also a need to have robots perform daily tasks, such as moving items around a farm, delivering supplies to a farmer in the field, moving debris from one location to another using a "follow me" function. This "follow me" function is extremely useful and could assist farmers and homeowners alike. A cumbersome task such as hauling a load of dirt from the front to the rear of a property could easily be performed by a bot having the "follow me" function programmed.

The robots could also perform other functions, such as providing security to farm lands through the use of sirens or other non-invasive, non-lethal means; preventing predators from attacking livestock using the same non-lethal means; monitoring the health of livestock through images and video; weather monitoring using onboard sensors; aerating soil by injecting prongs into the soil as the bots move about; and a variety of other chores and operations. Thus, the bot could become the modern-day work horse of the farm.

The foregoing discussion is intended only to illustrate various aspects of certain embodiments disclosed in the present disclosure and should not be taken as a disavowal of claim scope.

SUMMARY OF THE INVENTION

The present invention desires to provide a robotics solution to eradicating weeds, eliminating or minimizing pests, harvesting crops, moving cargo around, monitoring weather, monitoring animal health, aerating soil, providing security, and to performing a multitude of other tasks, jobs and functions as programmed, all using robots that are made from organic, recyclable, interchangeable parts such that if one bot fails it can easily be repaired using parts from spare bots or from new, interchangeable parts. Further, these robots will perform their tasks, and will either be powered using onboard solar power only or a combination of solar and battery power. If the system uses an onboard fuel cell or battery, then when onboard power runs low they will return to either a central or outpost recharging, refueling station. If no refueling post is available, the robots automatically conserve energy by entering a low power mode and wait for charging levels to increase (through solar charging for example). Ideally these robots will be either powered/re-powered entirely using energy acquired from renewable energy such as solar, hydro, wind, methane or any other type of renewable energy resource. Finally, the entire system, while mostly operating autonomously and able to deal with partial failure, will be overseen and run by a control company that is specifically designed to allow customers to order robots, that will deliver, maintain, repair and collect robots when their tasks are complete and to assist users with the entire system.

An issue or possible problem with using a single robot to perform some of these functions is that some of the tasks require multiple robots. For example, when harvesting plants, it is difficult to have one robot both pick and carry the produce. It is better to have one robot perform the cutting function and another perform the carry function. In addition, there are times when a robot requires assistance. For example, if one robot does not have enough power to pull a load up a hill it could be possible for another robot to come and assist. These cooperative robots are also an important element of this invention.

To perform many of these tasks the robots need to be trained to do a specific task. Currently there does not exist a way to obtain or gather this large data set. Another aspect of this invention involves human assisted machine learning whereby humans assist the robots while they are learning the task. As multiple humans assist the data base is concurrently constructed and the bots are trained.

In addition to the need to have the bots there is also a need for a system to deploy, command, control and monitor the bots. This system starts with a customer ordering a bot or multiple bots to perform a certain function or functions, followed by a control company delivering the robots to the customer. Next, having the control company oversee, manage, repair, replace the robots while they are performing their functions or duties, and finally, having the control company retrieve the bots from the customer for delivery to the next job.

The bots are able to negotiate around rural terrain and using either mechanical or an energy beam control system mounted to the bot or to other mobile devices, can perform a variety of tasks. Specifically, to control weeds; to control pests; and to harvest crops. This application deals specifically with pest control apparatus, and more specifically, for depredator and predator control apparatus, its mechanical components, energy source and utilizing and controlling the apparatus. This application also deals with the deployment, autonomous navigation patterns and cooperative behavior of a multitude of robots that perform tasks independent of human involvement. And finally, this application deals with the control company and the means to manage the bots.

5

Figure 3:
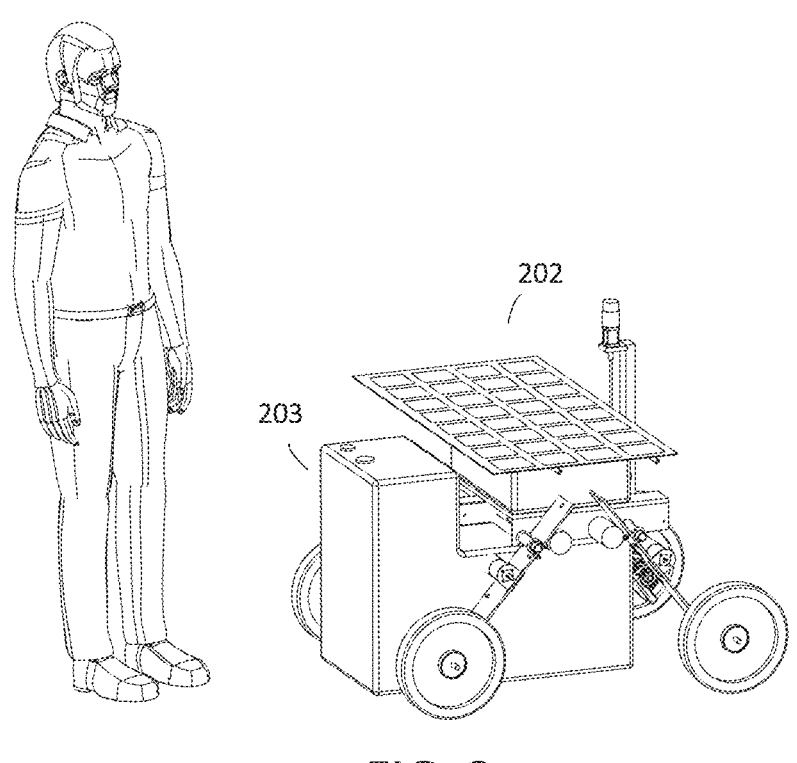

FIG. 3 is a perspective view of a different embodiment of the GURU, a fueling docking station and a user.

Figure 4:
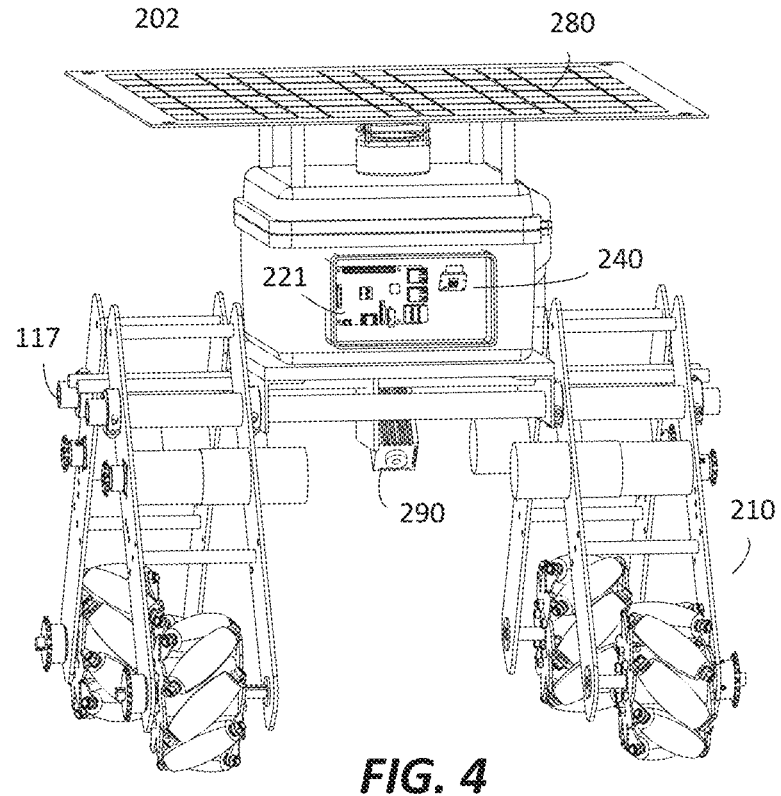

FIG. 4 is a perspective view of a different embodiment of the GURU.

Figure 5:
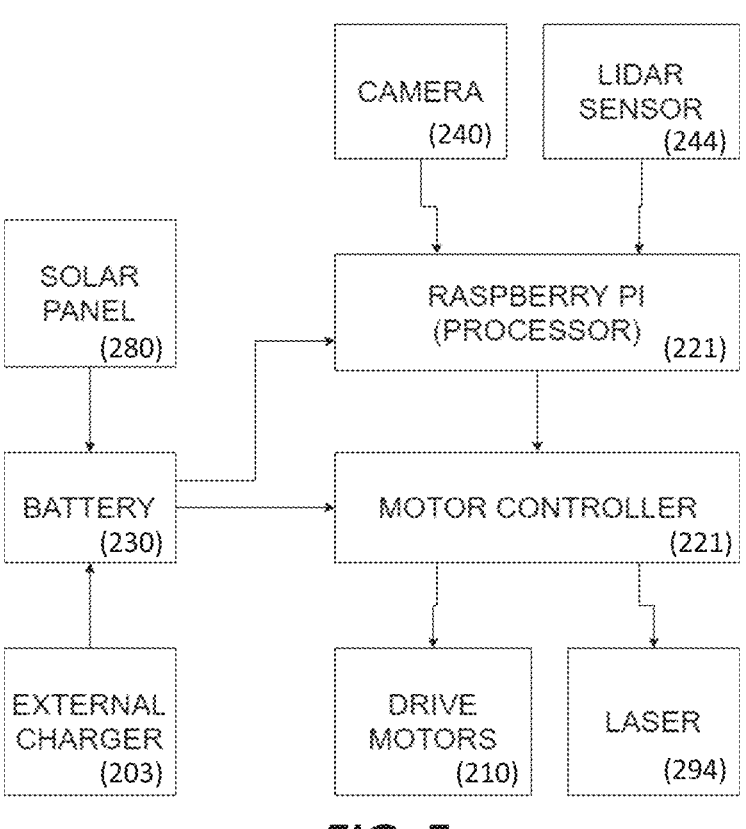

FIG. 5 is a block diagram explaining the GURU.

Figure 6:
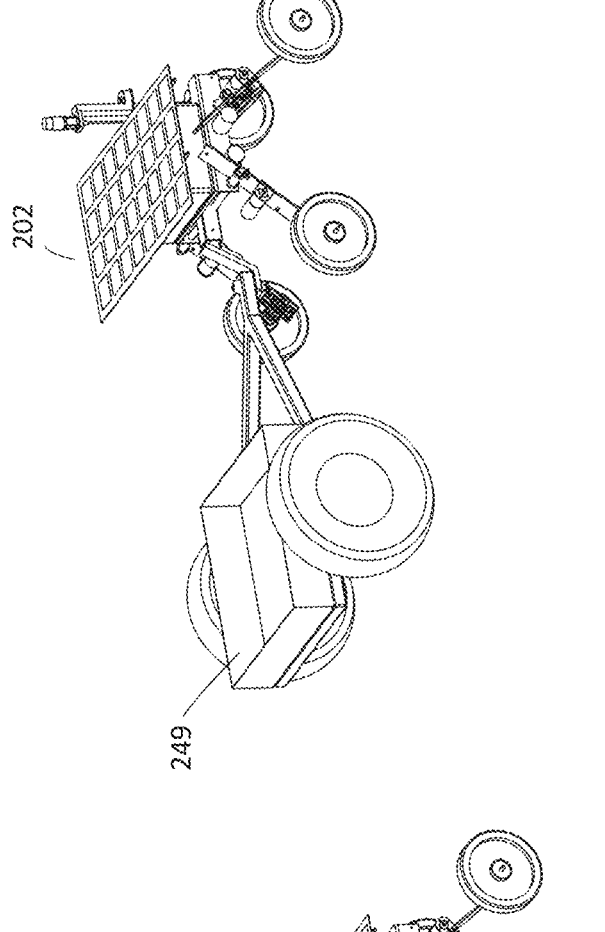

FIG. 6 is a perspective view of the GURU with a trailer hitch attachment and another GURU performing a follow me function.

Figure 7:
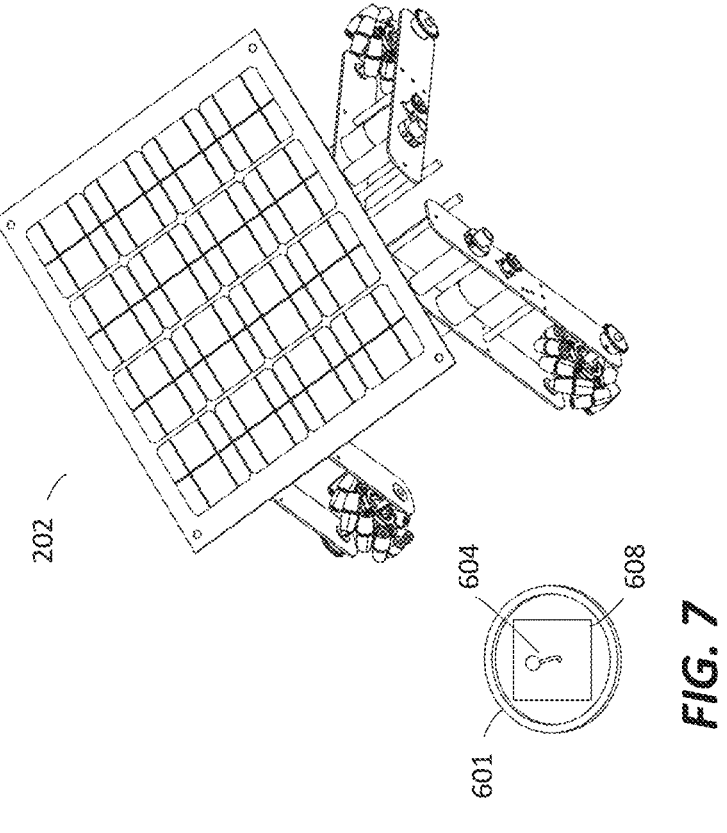
Figure 7:
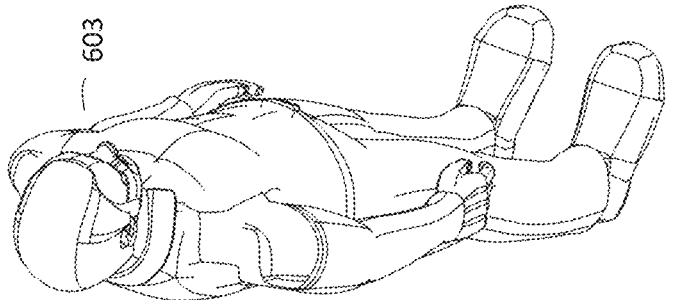

FIG. 7 is perspective view of the GURU with an object, physical marker and a human, showing the human assisted machine learning system.

Figure 8:
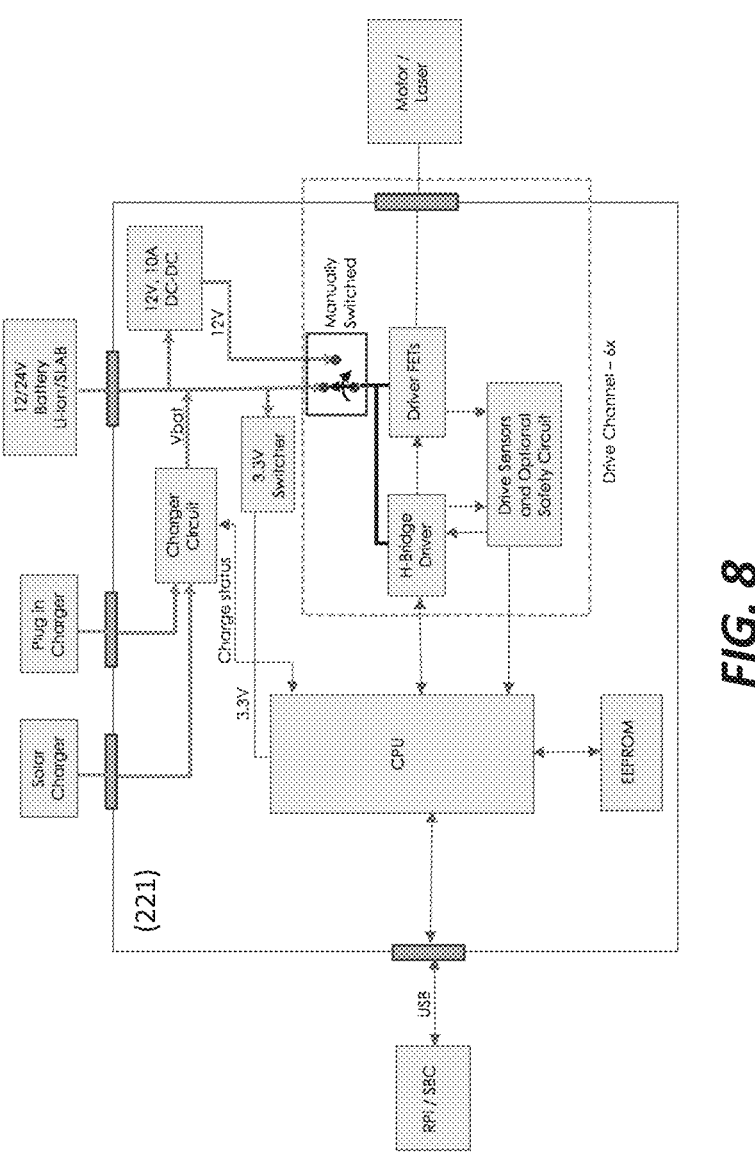

FIG. 8 is flow chart showing GURU operation.

Figure 9:
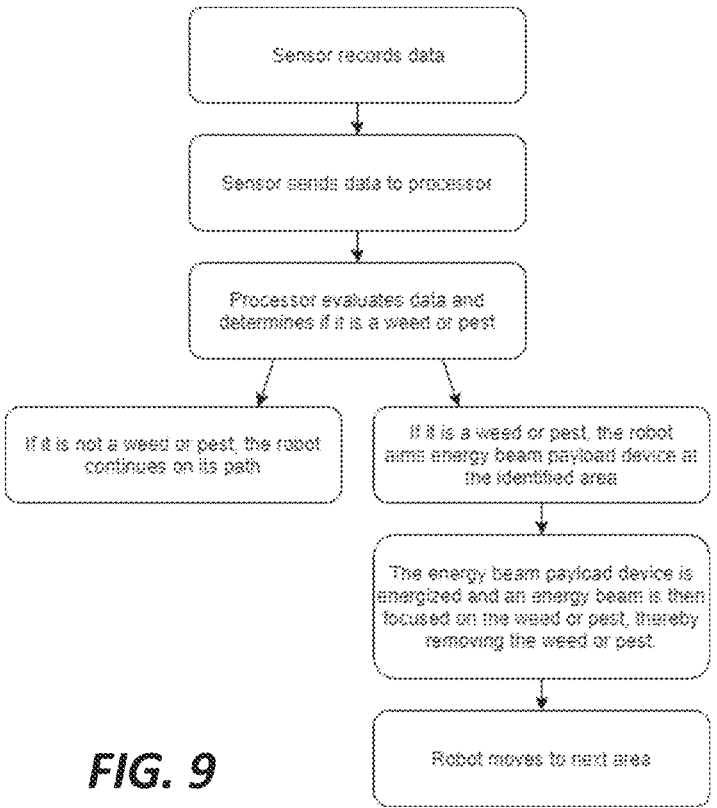

FIG. 9 is flow chart showing the operational steps taken to eliminate weeds or pests.

Figure 10:
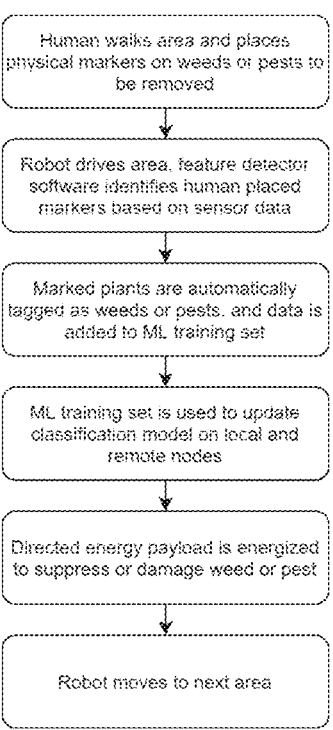

FIG. 10 is flow chart showing the steps performed for human assisted machine learning.

Figure 11:
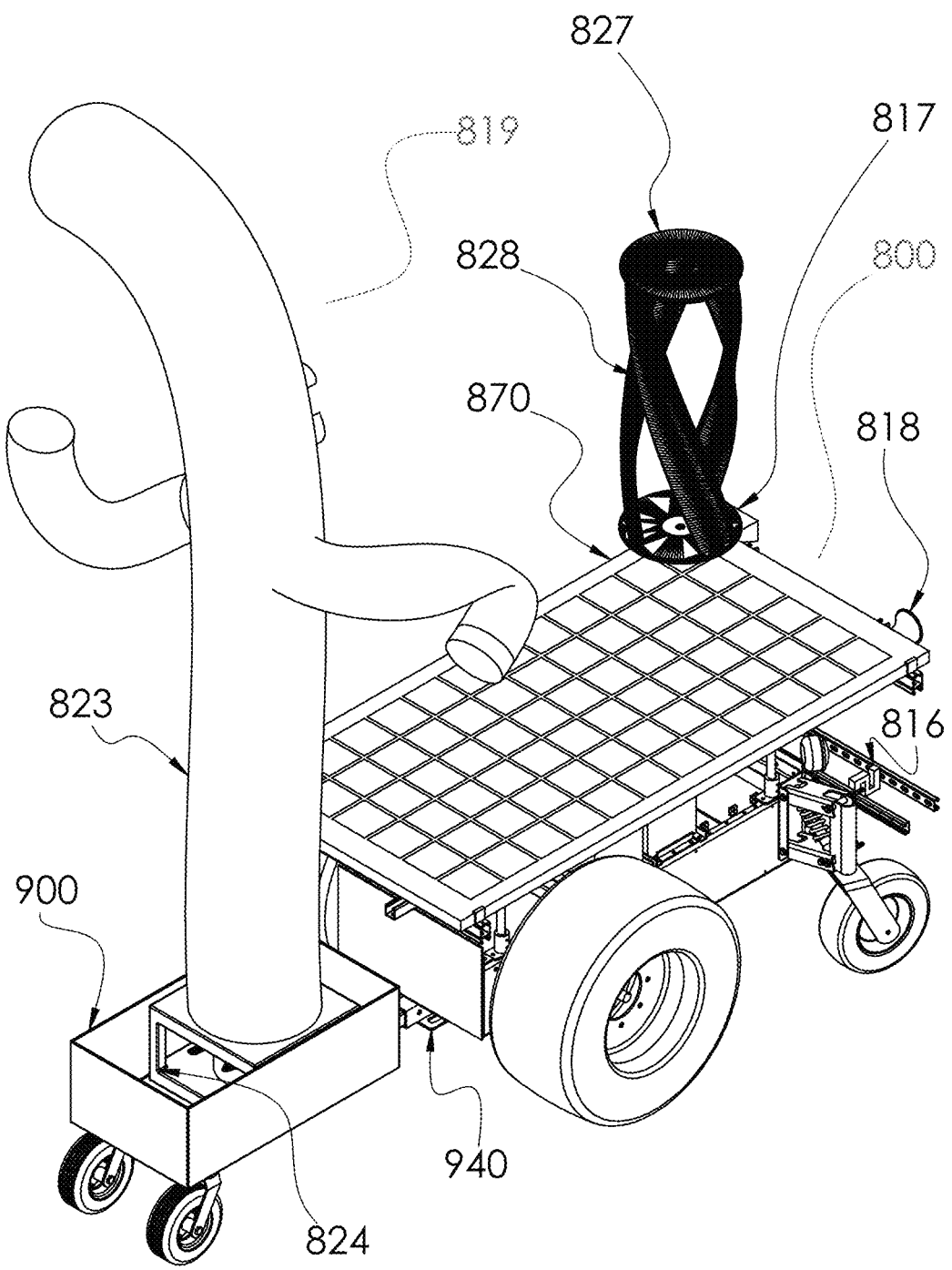

FIG. 11 is an elevated perspective view of the present invention with a skypuppet attached and being pulled in a separate trailer and windmill attached.

Figure 12:

FIG. 12 is an elevated perspective view of the present invention with the skypuppet being pulled and windmill attached.

Figure 13:
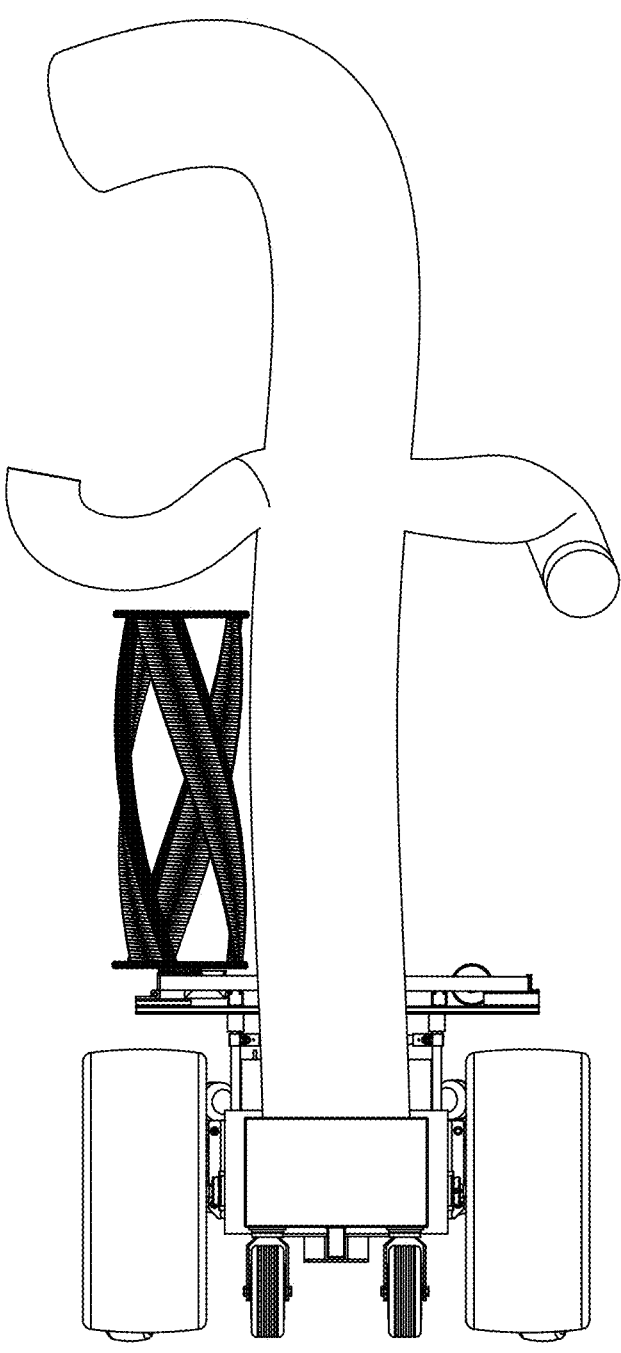

FIG. 13 is a second end view of the present invention with the skypuppet trailered and windmill attached.

Figure 14:
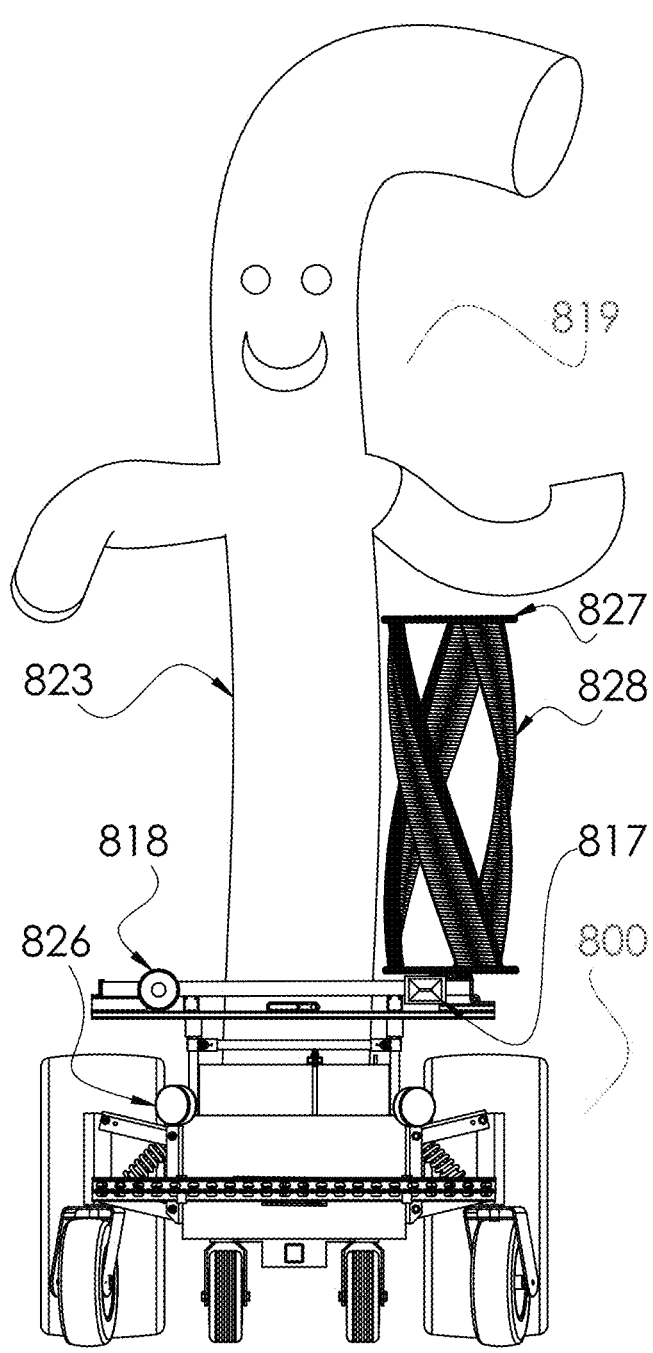

FIG. 14 is a first end view of the present invention with the skypuppet trailered and windmill attached.

Figure 15:
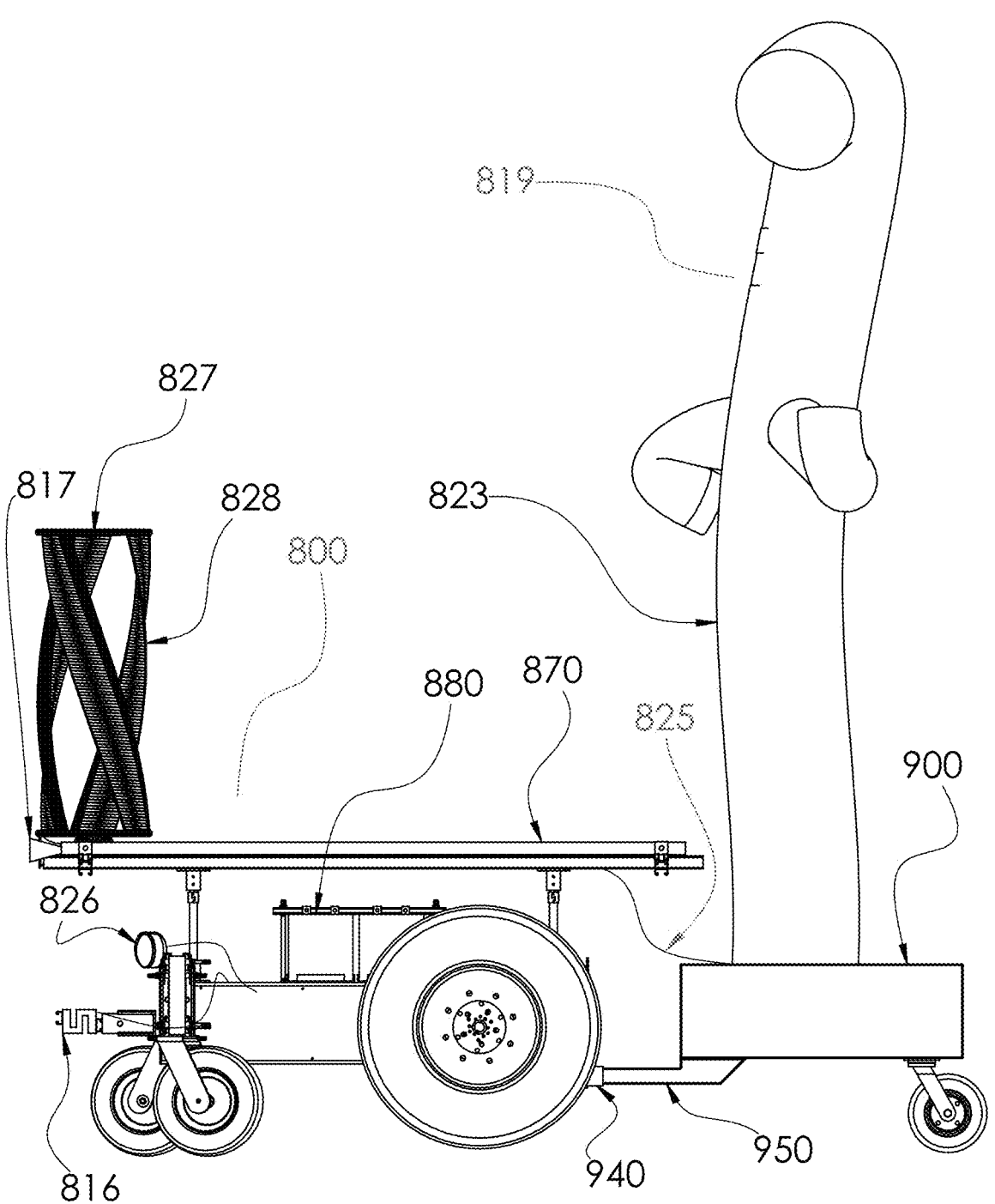

FIG. 15 is a first side view of the present invention with the skypuppet trailered, windmill attached, and other control devices attached.

Figure 16:
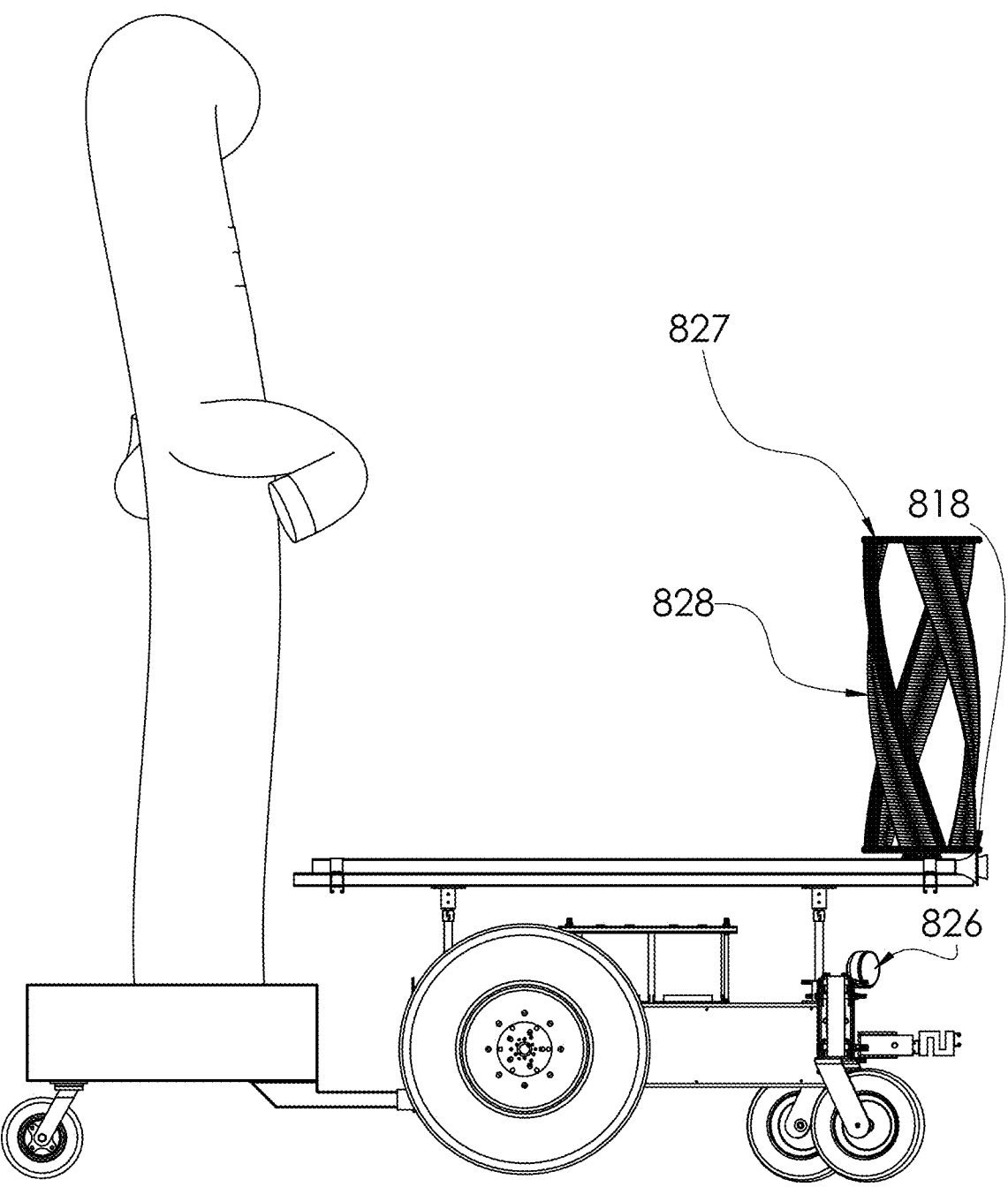

FIG. 16 is a second side view of the present invention with the skypuppet trailered, windmill attached, and other control devices attached.

Figure 17:
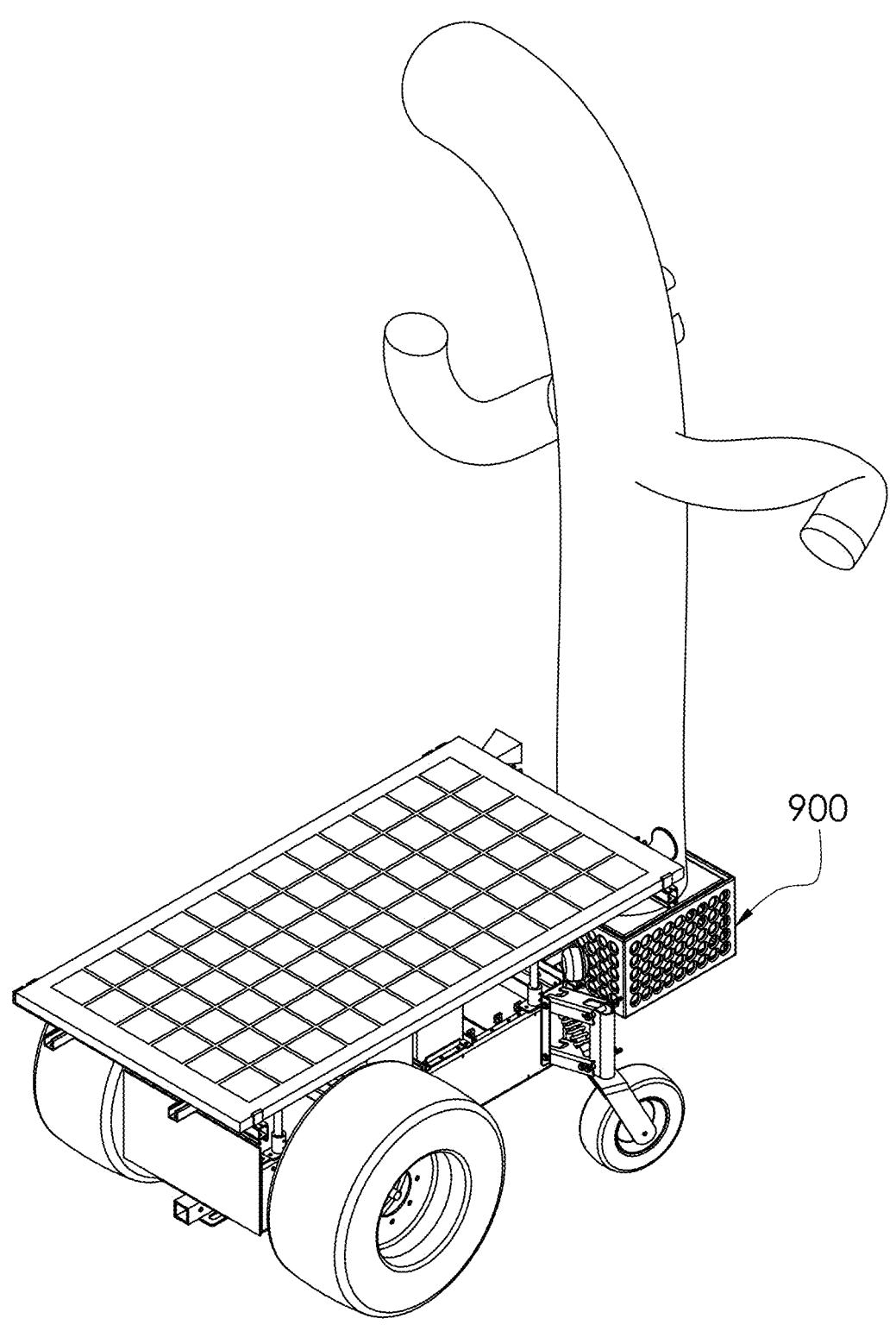

FIG. 17 is an elevated perspective view of the present invention from the second side with the skypuppet directly affixed to the robot at the first end.

Figure 18:
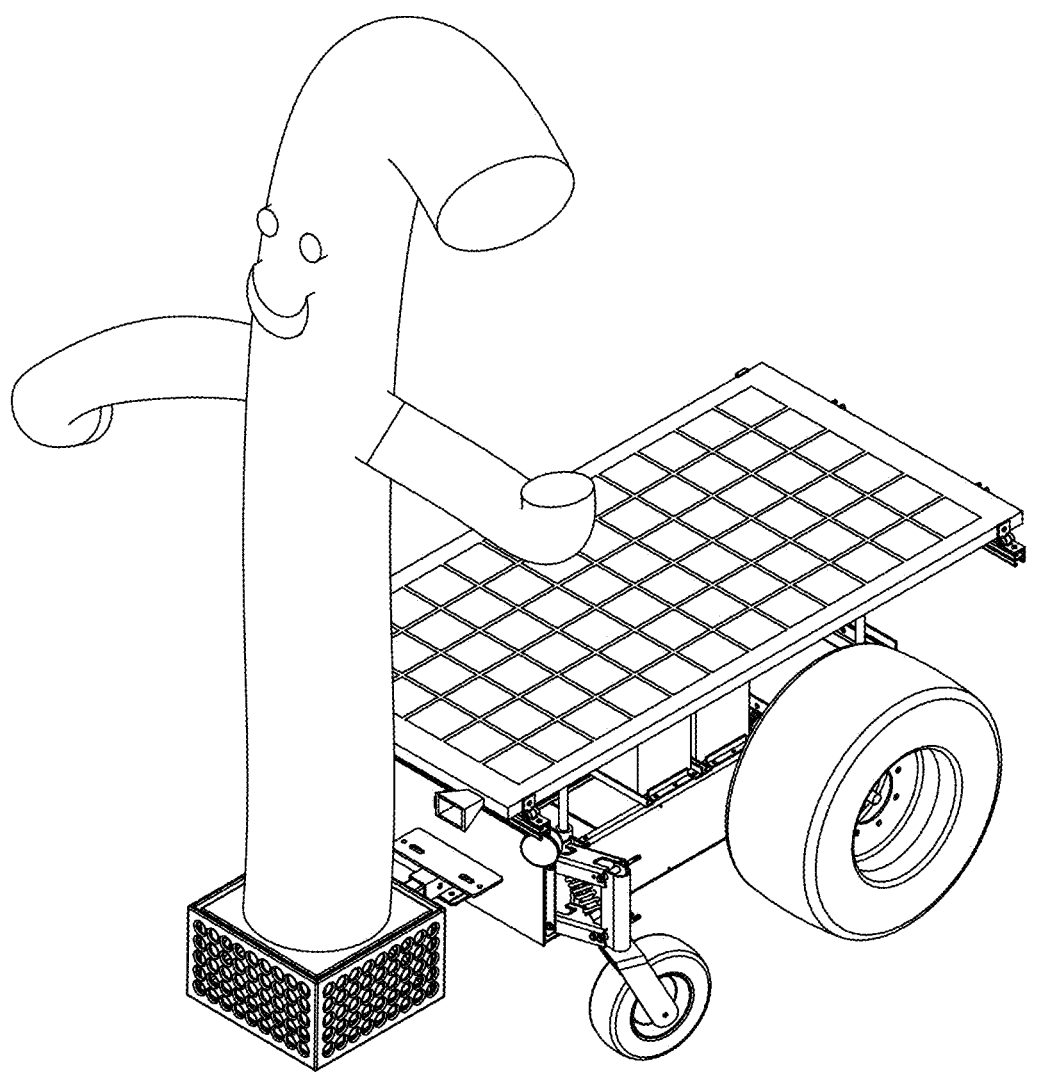

FIG. 18 is an elevated perspective view of the present invention from the first side with the skypuppet directly affixed to the robot at the first end.

Figure 19:
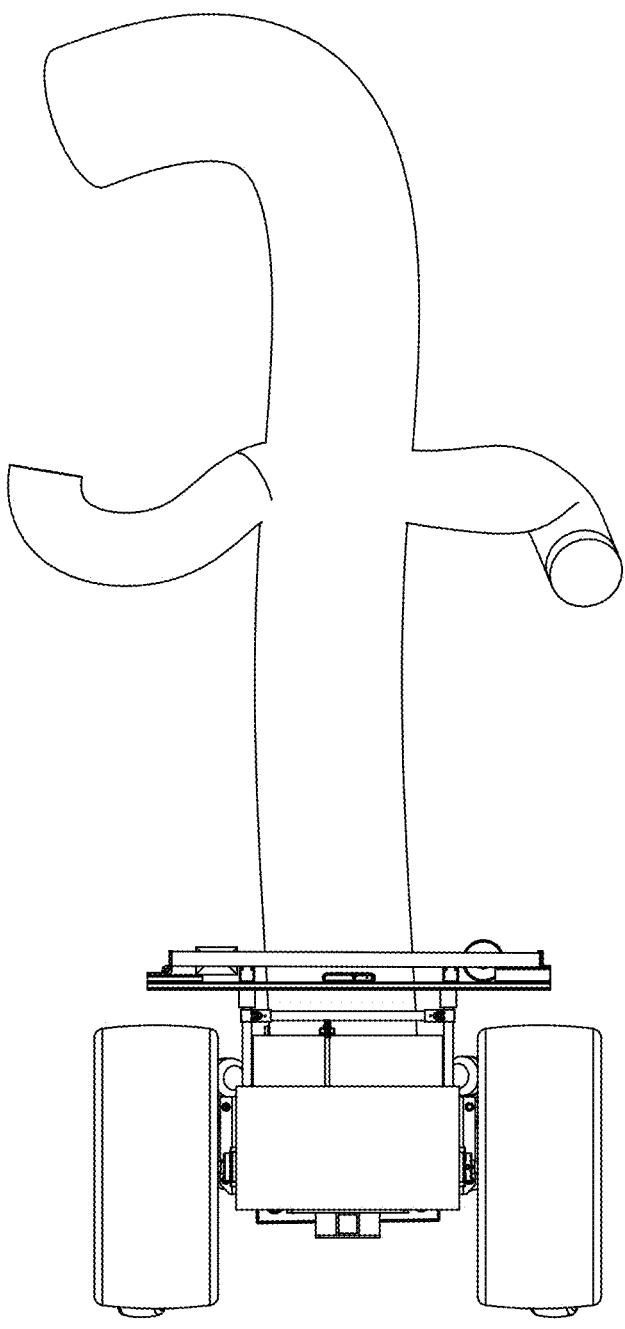

FIG. 19 is a second end view of the present invention with the skypuppet directly affixed to the robot at the first end.

Figure 20:
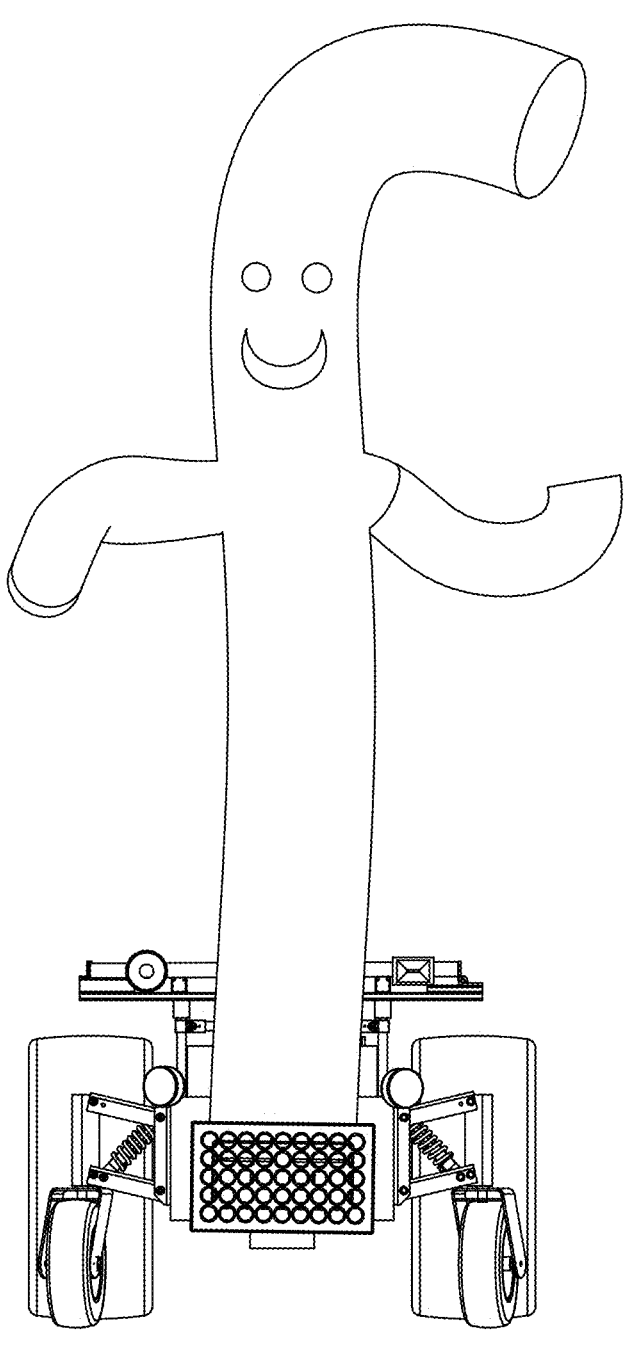

FIG. 20 is a first end view of the present invention with the skypuppet directly affixed to the robot at the first end.

Figure 21:
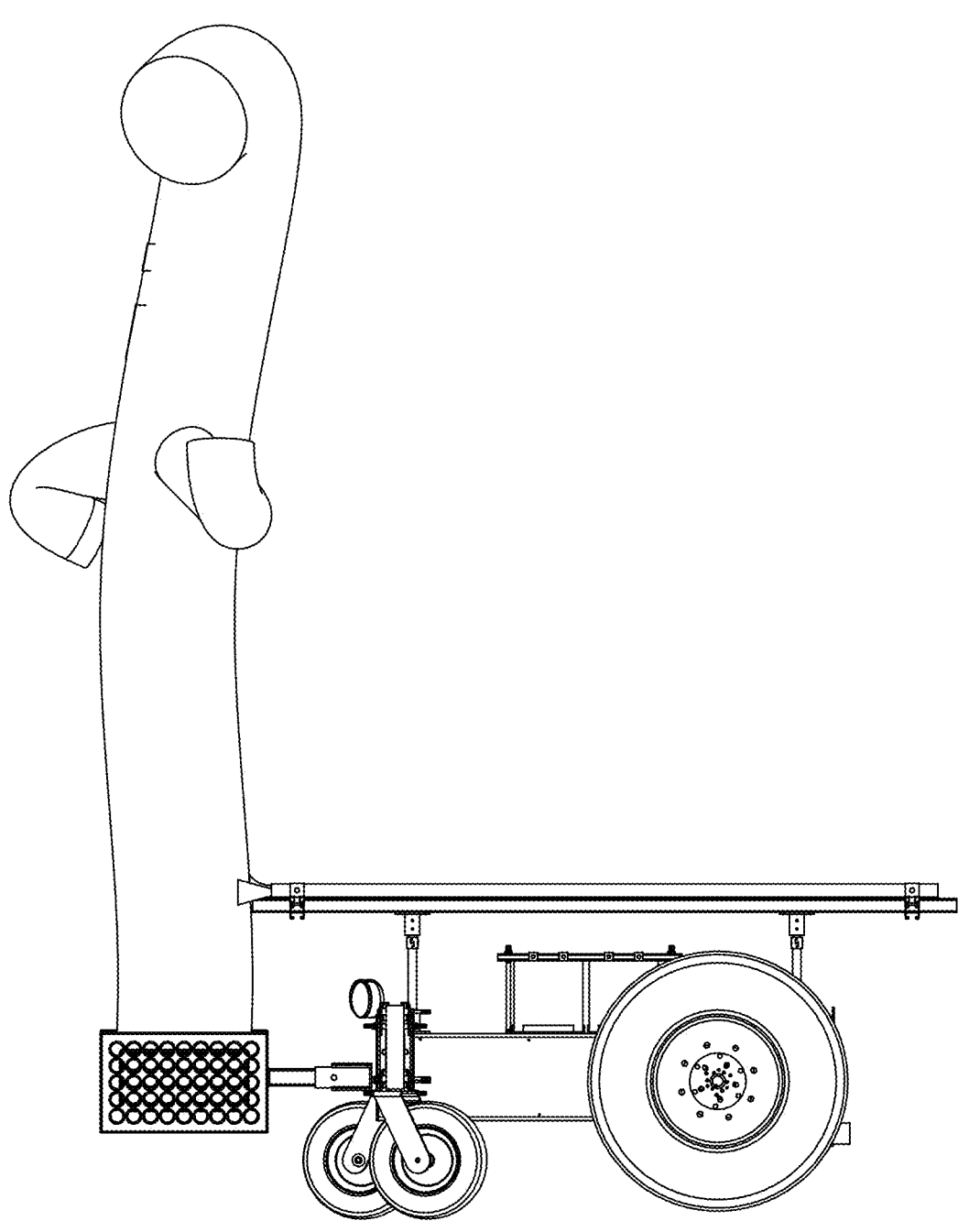

FIG. 21 is a first side view of the present invention with the skypuppet directly affixed to the robot at the first end.

Figure 22:
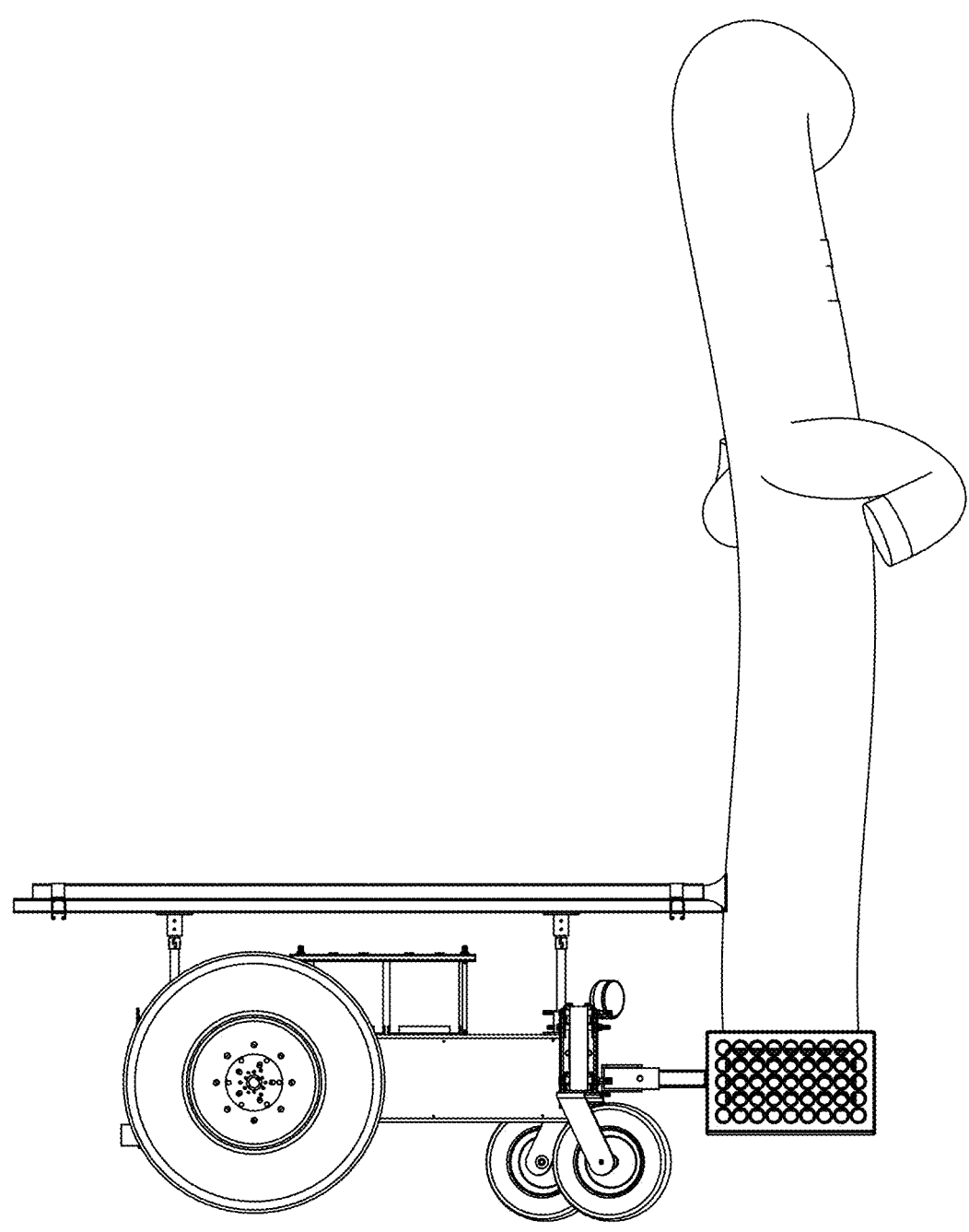

FIG. 22 is a second side view of the present invention with the skypuppet directly affixed to the robot at the first end.

Figure 23:
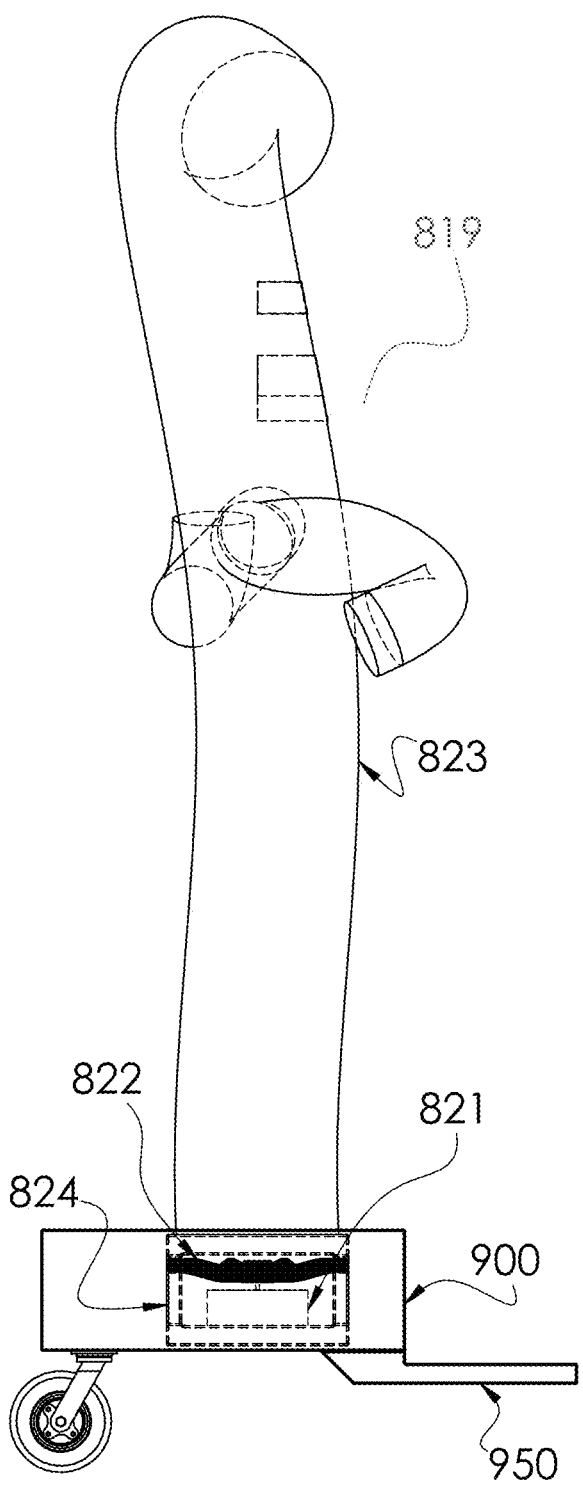

FIG. 23 is a first side view of the trailer of the present invention with the skypuppet and fan unit directly affixed to and part of the trailer.

Figure 24:
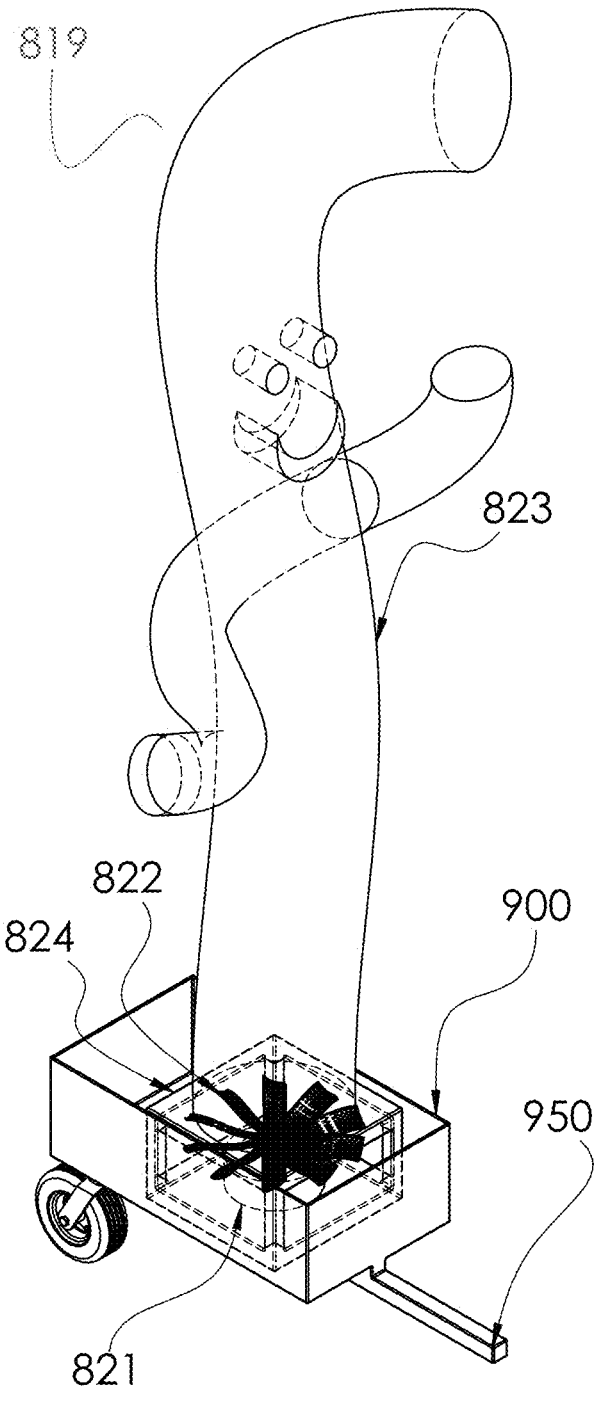

FIG. 24 is a elevated perspective view of the trailer of the present invention with the skypuppet and fan unit directly affixed to and part of the trailer.

The exemplifications set out herein illustrate various embodiments, in several forms, and such exemplifications are not to be construed as limiting the scope of the appended claims in any manner.

DETAILED DESCRIPTION OF THE INVENTION

The following detailed description teaches the now current preferred embodiments of the invention. However, it is noted that the claims and this invention are not limited by these descriptions. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiment; described and illustrated herein are non-limiting examples, and thus it can be appreciated that the specific structural and functional details disclosed herein may be representative and illustrative. Variations and changes thereto may be made without departing from the scope of the claims.

The terms "comprise" and any form of comprise, such as "comprises" and "comprising", "have" and any form of have, such as "has" and "having", "include" and any form of include, such as "includes" and "including" and "contain" and any form of contain, such as "contains" and "containing" are open-ended linking verbs. As a result, a system, device, or apparatus that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

ALLOCATION AND RESERVATION SYSTEM, DATA CONTROL SYSTEM AND METHOD USING A CONTROL COMPANY. In order to make all of the following described inventions work there needs to be a means, system or method to get the robots into the field and out to the customers. This will be described more fully below, but in general, the system includes an entire method and system to reserve bots, deploy bots, maintain bots and to retrieve bots. In addition, there is a system to collect, manage, sort, arrange, configure, utilize and store data. The reservation system is an entire method having the steps of having a customer either downloading a computer or mobile device application, or logging onto a reservations website, inputting data, a control company receiving the data, the control company analyzing the data, the control company utilizing the data and control company's own data collection to provide a service estimate to the customer based on the data analysis, control company compiling a second data set based on a second real-time data collection of weather and land for real-time analysis, providing a final estimate to the customer, customer accepts or rejects offer, if customer accepts estimate then control company deploys robots to the customer, unloads robots at customer's site, and robots begin completing assigned tasks. After the tasks are completed, the control company returns to the customer site and retrieves and removes robots from the site. The robots are then either returned to a storage facility or are moved to another customer's job site.

More specifically, the control company oversees and manages the robots for the customers, i.e., the farmers or individual customers, so that the customers are not responsible for maintaining and servicing the robots. The control company will provide multiple services and these services can include but are not limited to: bot reservations, delivery of robots when needed, providing technical support when needed, providing mechanical support and repair services for robots when needed so that the robots are continually operational, attending to software updates, overseeing general maintenance, assisting with data analysis (this could include weather forecasting, forecasting how many robot units will be needed for the next growing season, if robots should remain on the property for continued weather monitoring, predator monitoring, etc.) retrieving robots when their mission and duties are complete, and possibly assisting with the energy needs of the consumer and the robots. In addition, the control company will collect, sort, organize, manage, utilize and store a multitude of data collected while the bots are on site performing their tasks. This data is utilized for future assignments to the same customer, and to help estimate and provide information to customers in the general vicinity.

All of the above referenced systems and apparatus rely on the control company. The control company starts with reservations and the reservations software. The reservation software is accessible by the customer so that the customer can reserve robots and schedule delivery. This is started by the customer inputting a customer identifier, specifying a location and date, and setting a timeline of what needs to be accomplished. This timeline will depend on the type of service required, such as weed suppression, de-tasseling corn, applying pesticide, applying fertilizer, pest control, or any of the number of chores or tasks required and that can be provided by the bots. The software system applies the collected data and combines reservations from a multitude of customers to minimize the transport of robots between set locations. Next, the software allocates the number of robots required at each location and schedules the bots based on the number of requests, the tasks requested, and the acreage or amount of land requiring service. The software also creates alerts of an event that is sent to an operator or an autonomous vehicle that loads the required number of robots at a specified date created from the information inputted by the customer.

Each reservation begins with the customer utilizing a scheduling wizard. The customer inputs a variety of data, such as parcel number, address, crops grown, tasks required, preferred access to the property with predefined ingress and egress, and any other data deemed necessary for proper task execution and entry and eventual bot removal. It is also possible to automatically use gps and other systems to map the property and fields and to come up with a schedule, boundaries and paths for the robots to follow. The software compiles all the data and information and creates a customer profile.

This same software enables the control company to create cost and time estimates for each schedule. After the scheduling there is an onboarding operation that takes place once a year. In order to arrive at a cost estimate the system takes a multitude of data into account, including but not limited to historical weather data for the service area. Next, the system considers any data provided by the farmer or customer. Also, the system considers past data and success rates moving forward. Looking at the past weather information, customer information and past customer work data is helpful to obtain the best time to perform the desired tasks. Combining all of this information and whatever other data can be compiled the system generates a cost based on the number of bots required and the time allocation for the desired work performed and is delivered to the customer prior to final scheduling. At this time the customer can input his payment information and secure the reservation for robot delivery.

When the time comes for the robot delivery the system again analyzes the weather conditions, this time in real time, to compare with the prior data generated estimates and calculates a better, real time estimate of time and robots required to perform the tasks. At this point the system generates an estimate of renewable energy, typically solar, for the duration of the task. This second notification is sent to the customer for a real time estimate of energy required for completion. This is important as if, for example, the prior estimate was based on sunshine every day, but at the time of actual work there are clouds, storms and inclement weather. This affects the energy collection and possibly the time required for the job's completion.

After the customer confirms scheduling and delivery date the robots are set for delivery. At this time an alert or notification is again sent to the customer indicating arrival time. Another alert is sent to either a human operator or an autonomous vehicle that it is time to deliver the bots. The bots are collected from a main storage area where they are kept for storage, repair, charging, maintenance and upgrades, or they are collected and delivered from a nearer location where they were previously deployed, such as a neighboring farm. Once they arrive at the designated work area, or field, they exit the delivery vehicle and are sent to the field, thus entering the on-field operation stage. The bots then use the pre-assigned entrance routes collected from the customer to navigate to and through the field and to their assigned work areas. Then, an operator or software, confirms robot location through visual or gps data. The robot, because of built-in software, also knows it is where it is supposed to be. At this point the bot and the software shake hands to confirm that the bot is in the appropriate location to perform the tasks and the bots are then placed in autonomous mode, either by the local operator or automatically via the software. They go to work and operate continuously until their tasks are completed. The only restriction or limitation is their battery capacity and available solar energy collectable at the time of operation.

Once on the field and running the bots continue to communicate with each other. If cloud connectivity is available, then they post real time data to the cloud. This is not a requirement however as they can always connect up later and upload data at a later time. The software systems running within each robot performs real time updates with the other robots that are part of the same communication group using a local wi-fi hotspot, provided by consumer grade cell phones. The robots form an ad-hoc communication mesh network so that they can communicate with each other and so they can monitor each other's progress and health. Through this system they know if there are any issues with other bots or anomalies in the system.

If an error, anomaly, bot health or other problem is detected then the bots perform a variety of response actions. Typically, a problem would require one bot go and assist the failed bot. In order for the bots to decide which one should go they will perform one of several actions. A first way to decide which bot should go and assist is to perform an election. In this scenario the able-bodied bots share and compare information, such as their location and proximity to the downed bot, the ease of access to the downed bot, or any other information that allows the bots to choose which bot should lend assistance.

Alternatively, the bots can perform a random drawing to see which bot takes over the task of the failed bot. This choice may however cause one of the most inaccessible bots to have to come a long distance to help out.

These options allow one or more bots to lend assistance. If a disabled bot is down, not because of a failed battery or software issue, but is simply stuck, then other bots could come to the rescue by pulling, pushing or attempting to free it from its "stuck" situation. If assistance is futile and the bot remains stuck then one or more of the bots could send a distress signal to the human operator or to the operating software to notify a human operator of the situation so that sufficient resources, such as a human assistant, can be sent to find, retrieve and repair the downed bot.

Similar to the assistance lent to downed bots, the bots can communicate with each other and lend assistance if one bot is behind with its' assigned task. Once a bot completes its' assigned task it communicates with the other bots to find out if there is another bot in need of assistance. If help is required, the "work completed" bot goes to the work area occupied by the slower bot and assists until the task is completed.

Finally, after all of the tasks and chores are completed, the bots are retrieved from the workplace. This is called the collection stage. When the bots have entirely completed the assigned work, they communicate with each other confirming completion, they then use the predetermined egress paths to exit the workplace and to go to the collection zone. Once assembled they are loaded using a variety of navigation options that are similar to the loading options. A first method of loading is autonomous where the bots drive themselves into the collection vehicle. Another method is assisted navigation whereby an operator "drives" the bots with a controller of some sort. In this way the operator helps the bots avoid obstacles and assists them into the transport. Finally, they could use a semi-autonomous system where it is a mixture of manual, mixed manual (for example, to avoid a wall), autonomous, or path planning. Any combination of navigation is possible. Using one of these three preferred systems the bots wait for the human operator or autonomous vehicle to arrive and signals them to load in a sequential fashion into a transport vehicle, whereafter they are taken directly to the next work field or station or are returned to the bot storage facility for repair or maintenance.

The above reservation system is the starting point for the customer use of the outdoor utility and agricultural task system using lightweight self-charging robots. Next, the actual robots and robot system is described.

Figure 1:
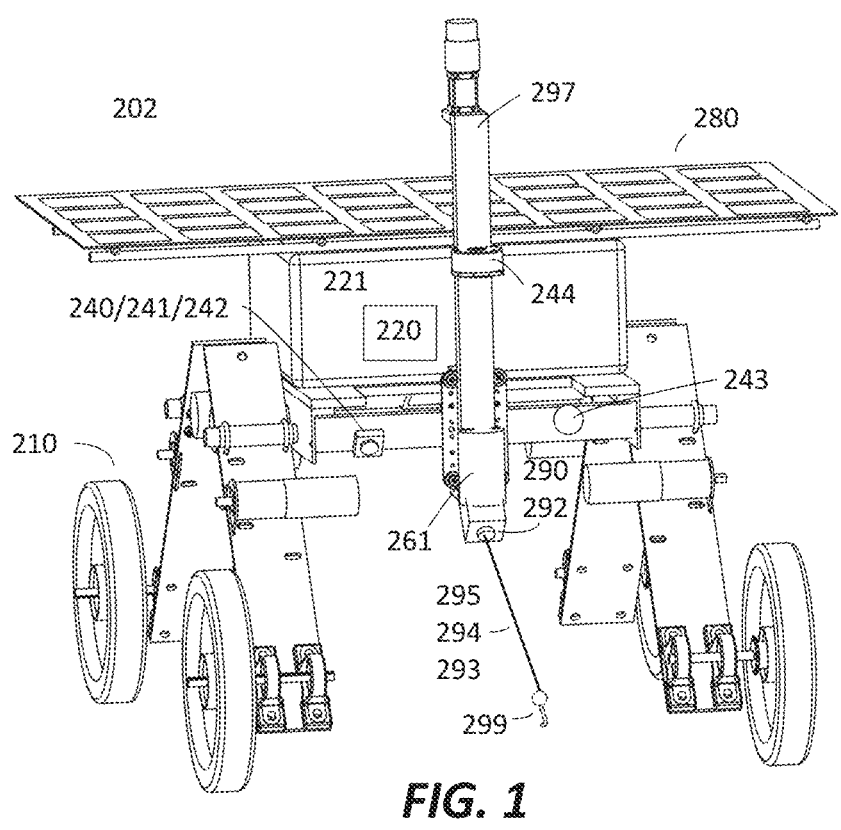
FIG. 1 is a perspective view of a GURU of the present invention.

ROBOT SYSTEM. In all of the preferred embodiment there is an autonomous robot system 1 that at its core has an autonomous ground utility robot unit, or GURU 2, as shown in FIG. 1. This system includes at least the above described reservations system and at least one GURU 2. This system also includes a computer program 20 that allows the GURU 2 to navigate in either a structured or unstructured environments of varying terrain. The GURU 2 of this system, more clearly defined below, has at least a chassis 11, onboard sensors 40, a mobility apparatus 10, payloads 62, and/or attachments 19. The attachments 19 can be any of a variety of attachments 19. Some are designed for snow removal or for moving dirt and debris. Some could also be a trailer or some other apparatus to pull behind the GURU 2 and are connected to a trailer hitch 18, as shown in FIG. 6. In addition to the attachments 19 the GURU 2 may have a payload receiving system 60. The payload systems include a payload receiving apparatus 61 and a payload 62. The payloads 62 are designed to perform a variety of tasks. Some are designed to suppress weeds, others are designed to control pests, other for harvesting crops but all are designed to be received into the payload receiving apparatus 61. By way of example the payload could be an energy beam control system 63, designed to suppress weeds or pests with an energy beam. To perform these tasks the GURU 2 utilizes at least one onboard sensor 40 that is controlled by the onboard software 20 and onboard electronics 50 stored in an electronics enclosure 51. In addition, the system may have a fueling port 3 with fueling connectors 4 incorporated into the GURU 2. The fueling port 3 may also have a backup refueling port battery 5. In order to power the mobility apparatus 10 there is a rechargeable battery 30 powered by a solar array 80 on the GURU 2. It may be also possible for the GURU 2 to recharge at a fueling port 3 and it may also be possible to recharge at the fueling port 3 via an inductive charging port 70 through inductive charging plates 71 located on a bottom of the GURU 2.

COOPERATIVE ROBOTS. The GURU 2 can also act as cooperative robot, working with an in conjunction with another GURU 2. When the GURUs 2 act as cooperative robots, they have the ability to interconnect with other GURUs. This cooperative functioning has several advantages. First, connecting to other GURUs provides more moving power to the first GURU 2 or allows one GURU 2 to move, assist or relocate a disabled GURU 2. Next, the robots communicate with each other and if one GURU fails or becomes disabled or stuck, then it will communicate its predicament or problem to the other available GURUs 2. They will then select the closest GURU 2 to come and assist the disabled or needing robot. This might mean that the assisting GURU 2 may take over the function or task of the original GURU 2. Or, it may mean that the assisting GURU 2 comes and provides additional power or resources to perform a function, such as pushing or pulling a stuck GURU 2 or providing additional power to move a load or even to help the first GURU catch up with the work assignment. This ability to link together allows the GURUs 2 to work as a team. Using an autonomous navigation systems to locate each other they can form a train, attaching securely front to back, using an electromechanical mechanism, or electromagnetic latch. This allows 3 robots the ability to pull nearly 3× the load over what a single GURU 2 can pull.

HUMAN ASSISTED MACHINE LEARNING. As shown in FIG. 7, another unique aspect of the present invention is a method of human assisted machine learning. This will be defined more fully later, but in general, the system includes having a human 603 deploy a marker 601 over an subject 604 to be identified, having the GURU 2 locate the marker 601, identify the subject 604 and then enter the information into a data bank. FIG. 10 is a flowchart defining and setting out the procedures and steps followed to complete the process.

GURU. To more clearly and specifically define the invention the figures and specifics of the invention will now be described. FIG. 1 shows a first embodiment of a Ground Utility Robot Unit, or GURU 102. The work horse of the robot system 1 is the Ground Utility Robot Unit, or GURU 102. One preferred design for the Ground utility robot 102 consists of: a rectangular metal/wood chassis 111 having at least one and preferably two identical motors 112 placed on opposing sides of the chassis 111; a mobility apparatus 110, preferably a caterpillar track system having sprockets 113 and chains 114 attached to the motors 112; tracks 115 around the sprockets 113 (similar to earth moving vehicle or caterpillar); onboard sensors 140 and onboard electronics 150 that provide autonomous and remote-control navigation; onboard software 120 and computer processor 121, an onboard solar array 180 and an onboard fuel cell 130; a trailer hitch 118 and a payload receiving system 160.

It is to be understood that these specifics are not limiting and that the GURU 102 could use other similar parts to accomplish the same end result. It is also to be understood that not all of the above referenced parts are required for operation and that removal of some will not destroy the usability of the GURU 102. For example, the motors 112 are preferably 2 HP electric motors but they could be different sized motors. Ideally the motors 112 will be powered by solar arrays 180, such as a 200 W solar array or smaller arrays, such as the 2 W arrays. They could alternatively be powered by other means, such as propane, methane, gasoline, diesel or another alternative energy source. The GURUs 102 could also run on a combination of fuel or energy sources. The means to power the GURU 102 is only limited by the existing technology.

The chassis 111, as shown in FIG. 1, is preferably manufactured from recycled materials or easily recycled materials that are environmentally friendly. However, any material could be utilized to create the chassis 111, such as metal, plastics, carbon, graphite, bamboo, rubber or any other material that will accomplish chassis construction. The chassis 111 could be a combination of materials. The chassis 111 as shown in FIG. 1 will also have an 18-inch ground clearance, but again it could be any clearance as long as the robot is able to accomplish its tasks. The chassis 111 must also be capable of side to side and up and down movement in order to position certain payloads 162, such as an energy beam control system payload 163, so it could have a linkage chassis 116 to allow for movement, along with a pivoted suspension system 117. It could also have the trailer hitch 118, either standard or custom, for securing and pulling accessories, such as a trailer, or to link together with other GURU 102 to utilize the cooperative GURU function as described above.

The mobility apparatus 110 could have a caterpillar track system 115 having tracks that rotate around wheels; however, any type of apparatus or system that allows the GURU 102 to move about varied terrain is acceptable. FIG. 1 shows that this mobility apparatus 110 could include any type of wheels, including: inflated or hard rubber, flat free tires 123, as shown in FIG. 1, or other material. Another variation could be any rotational wheel type apparatus with prongs to aerate the soil or virtually any other rotational apparatus to move the GURU 102 around. Obviously, the easiest and most accessible apparatus would be wheels of some sort, but it should be understood that other means may be used.

In yet another embodiment the mobility apparatus 110 could be a multi legged configuration similar to hexapod robots. In this embodiment the GURU 102 is moved around by legs 122 and the GURU 102 is an insectoid device 124 having the legs 122 that navigate and move the device around. In addition, the legs 122 would allow the GURU 102 to climb steps or navigate rocks or other obstacles that a wheeled device could not get around. The legs 122 would also allow the device to infinitely adjust the chassis position. And although it may be more difficult to program and control it would make the GURU lighter as there would no longer be the need to have a complicated pivoted suspension 117 system or the linkage chassis 116. The legs 122 would simply align the energy payload rather than the pivoted suspension 117 and linkage chassis 116.

These bots, for all their simplicity, have sophisticated electronics and thus the bots are weatherproof and have parts that are waterproof, such as an electronics enclosure 151 that is weatherproof as it contains the electronics 150, batteries and sensitive components. This is essential for the desired continual 24/7 duty cycle expected of the unit. It is also essential to preserve recorded data and to ensure that the bot is operational at all times. The bots ideally have a variety of sensors 140 and the electronics 150 included, among other things, allow the bots to be Wi-Fi hot spots so that no internet connection is required. The bots are autonomous. They have distance ranging sensors (as in an ultrasonic sonar 149, laser range finder, or LIDAR 44, and continual programming throughout the day and night to assist the bots with obstacle avoidance, no matter the time of day or what the weather conditions. They have motion sensors 143, such as cameras 141 for motion sensing, real time viewing, telemetry and for debugging. Ideally, they will have at least one and preferably two or more cameras 141 for depth of field vision and to cover more area and to collect more data. They could have infrared cameras 142 as well so they can have night vision. They should have microphones 145 to record data and to hear things, such as predators or invaders. They might have LED high powered flash lights 147 or other lighting to assist with video, image capture, or to act as a deterrent and to scare off predators, invaders, thieves, etc. They could also have an audible device 146 such as sirens, bells or whistles, again to send warnings, alert the customer, or to deter predators and thieves. They will have a GPS system 148 to assist in their mobility and location. Finally, they may be able to sense air and soil conditions through a variety of ground and air sensors so that the GURU is able to record and store temperature, humidity, altitude, wind speed, velocity and direction and any other parameters set out by the customer.

Ideally the GURU 102 is indestructible, but obviously that is virtually impossible. So, as an alternative, the GURU 102 will at least have the following characteristics. The bot is light and easy to move around. This is so it can easily be loaded and unloaded at jobs and is easy to move around for repair. The bot is resistant to wear and tear through vibration and abuse in the field and is able to operate in all temperatures and in all weather conditions. Constantly moving through fields, even at a slow pace, takes a toll on the bot, so it must be able to withstand the abuse, as the bot should last at least 5 years. It is modular so that if a part fails it can be quickly and easily replaced with a duplicate part. This modularity is also part of the plan to have multiple robots in the field and on site at one time. Thus, if one bot fails it is easy to borrow a part from a stagnant bot for replacement, at least until replacement parts are delivered to the site. As the bots are all the same it is possible to interchange parts quickly and easily. Thus, it is clear that there are a number of variations to the preferred embodiments and so these embodiments are not meant to limit the invention.

The GURU 102 runs entirely on solar power in the preferred embodiment. However, there may also be an onboard fuel cell 130 to compliment and support the onboard solar array 180. If an onboard fuel cell 130 is included, then the onboard fuel cell 130 will recharge itself mainly using the onboard solar array 180 but if needed the system may include refueling at a fueling docking port 103. This docking port 103 could be connected to the grid but could also have a large capacity fueling port battery 105 along with its own on-site solar array 181 so that the battery 105 can be recharged using only the on-site solar array 181. In addition to or in place of the on-site solar array 181 the system could be powered by other alternative fuels. These alternative fuel sources could include but are not limited to methane, hydro, latent ground heat, thermal or wind and fuel cells.

The GURU 102 will automatically know when it needs to recharge based on programming that takes into account data including but not limited to its current charge level, its distance from the fueling port 103, and the amount of time and obstacles required to pass to return to the fueling port 103. Once this is calculated the GURU 102 will self-navigate and return to the refueling fueling port 103 to automatically refuel. Once at the fueling port 103 the GURU 102 will recharge either by docking into a fixed port via the fueling port connectors 104 on the GURU 102 or by utilizing an inductive charging port 170 using a charging plate 171 on a bottom of the GURU 102.

It is also important that these GURU 102 have the ability to navigate in both structured and unstructured environments. A general aspect shared between all GURU 102 is autonomous navigation in an unstructured, dynamic environment, with or without the use of GPS. The GURU 102 are taught a logical "graph" of the locations and paths between them, then use that pre-learned topological graph to navigate, using real time localization from all available sensors. Also, the GURU 102 can operate in a geo fenced area or a learned route (visual learning or using a set of GPS coordinates) that will teach the GURU 102 so that it can avoid any obstacles by either stopping or taking evasive action. Onboard sensors 140, such as cameras, provide data for autonomous navigation and for remote telemetry/capture/real time monitoring. The GURU will use a navigation pattern suitable to the terrain and task: in a flat, unstructured hay farm, or grass lawn, the GURU will use a spiral pattern, picking a center, then starting on the perimeter of the geo-fenced area, and decrease the radius as it rotates around the "virtual center" of the task area. This minimizes abrupt turns, saving energy, and allows the GURU to exit, from the center of the area using a direct path to the exit point. The spiral pattern is achieved by moving the virtual GPS markers closer to the center, after each rotation, forcing the GURU to navigate an increasingly smaller area, again in a circular pattern.

The GURU 102 also features artificial intelligence with an ability to learn as it works. One way to teach the GURU 102 navigational skills is through training. In this scenario a user uses a training procedure whereby the GURU 102 is moved around a specified area. For example, it could use a two-node training system where the user assigns a point A and a point B and where the GURU 102 then navigates between points A and B. While navigating between these two points the GURU 102 will collect data and information using the onboard sensors 140, such as location sensors (GPS), inertial sensors, magnetic field sensors, microphones and cameras, and will apply this collected data to learn from this information.

Alternatively, the GURU 102 could be trained using geofencing and virtual GPS markers. In this scenario the user supplies a predefined graphical area in which the GURU 102 is allowed to roam. This area can be created from GPS coordinates, for example or even from Google® maps. The area is defined using virtual coordinate markers, which appear as obstacles in a 360-degree obstacle profile. The virtual obstacles and the real obstacles (detected through onboard sensors such as LiDAR, sonar, infrared emitters) are fused into a single obstacle depth profile, used by an autonomous navigation software. Once this area is defined by the user the GURU 102 is allowed to freely roam around the predefined area. As it roams this area it again will use onboard sensors 140, microphones, cameras, etc. to collect data from which it will learn.

The bots can perform a variety of tasks and will be extremely useful to the consumer, customer or user. It is envisioned that the bots be affordable, resilient, low maintenance, autonomous and environmentally friendly. Specifically, it is envisioned that the bots cost approximately $5,000 or less. That they have a duty cycle duration of approximately in 75% active and 25% low power mode, with the ability to charge while performing a task (through solar). Minimum runtime is expected to be 6 hours. As low maintenance devices it is contemplated that they will only require maintenance or service less than once a year (for repair or replacement parts). The fuel source should be environmentally friendly and preferably off the grid. To that end electricity will come from solar or grid tied base (docking) station, docking port 103, which could also have the large battery pack 105 that is solar powered via the on-site solar array 181. Alternatively, the methane system could be used where the methane is collected from the user's livestock, stored and distributed to the user and other users in the near vicinity. The refueling for the bats will take place at the autonomous docking port 103 whereby the bats automatically returns to the docking port 103 when it is in need of refueling. And finally, the bat system has a limited environmental footprint. As such it is envisioned that more than 90% of the materials used for the bats will be from recycled materials plus renewable materials by weight. This will create a net negative climate warming print through the removal of potent greenhouse gases.

Software. The above robots all have an extremely intelligent software system built into them and into the control company and this software is also an integral part of the invention. The platform is also quite sophisticated. It includes self-update capability (self-update task service), secure (simple RBAC AuthZ model: admin, automation, local user), telemetry to cloud, (if internet access is available), local persistence of configuration and sensor data and actuator commands. It also features great autonomy. Some of the features include: localization using depth profile, GPS, Wi-Fi signal strengths; navigation using topological path planner (which relies on localization); real time obstacle avoidance with signal conditioned input from 2D LiDAR, sonar, vision; IMU inertial drive controller (tilt, collision); feature detector, feature matcher services; IMU, temperature, etc. sensor services; and weed and pest classification using machine learning algorithms. The software covers not only the entire reservation system as described above, but also systems that provide: obstacle avoidance, autonomous docking, autonomous refueling that includes locating the docking port 103 when fuel is low and connecting with the fuel source while docking (either through a plug in attachment or through inductive charging system, user guided topological learning tasks, that is, learning the logical graph of locations where the GURU 102 will operate, virtual GPS markers restricting movement in a pre-defined area, marking obstacles or hazards to navigation, autonomous or semi-autonomous navigation using a learned topology map or global positioning coordinates, telemetry publish to stream ingestion compute nodes (in remote data centers, and to local peer robots), update of learned tasks from offline training, downloaded synchronized from remote nodes, fleet management code and self-update of all code and configuration (part of common control company software platform), anomaly detection and peer monitoring software that enables robots to take over tasks for a robot that has failed performing its task, within predefined time and space parameters, and leader election software algorithm that enables one healthy robot, from a deployed group, to take over the task for a failed robot.

HUMAN ASSISTED MACHINE LEARNING AND REAL TIME SUBJECT IDENTIFICATION. In addition to the reservation software, the operational software and the bot apparatus, there must be an efficient method or means to train the bots. Thus, this invention also teaches a human assisted machine learning and real time subject identification system, as shown in FIG. 7 and FIG. 10 flowchart. This system is based on a computer vision algorithm that processes camera images and identifies particular physical subjects of a specific color and pattern on their surface, such as weeds/non-weeds. This machine learning uses human assistance to facilitate learning. The system is relatively simple, but is quite unique. To start, a human 603 will take a physical marker 601 and places it over a subject 604. Ideally the marker 601 is an open ring, an open box, or any other configuration that has an open center and creates a perimeter around the subject 604. The human 603 will take the marker 601 ring and place it around the subject 604 to be identified. Once the physical marker 601 is placed on or around the subject 604 the onboard camera 605 captures an image or images 606 of the subject 604 to be identified. Next, the robot software system/onboard software system, uses image processing through a programmed image processing algorithm 607, to detect the subject's visual signature 608 in real time images. If the physical marker 601 is identified in the current marker image 606, then the enclosed image area is cropped, edited, labeled and stored as a separate, final image 609 for future machine learning training tasks.

This system works to very quickly advance the machine learning in the beginning by utilizing large numbers of humans to assist with the identification process. For example, each customer could be given some sort of incentive to assist in the program. After accepting the incentive, each customer would be responsible for placing may be 500 markers on weeds. As an example, if the system rolls out and has 500 customers and all customers agree to participate in the incentive program, and if all complete the incentive program, then the customers would input 250,000 pieces of data in the form of camera images 606.

This system is also designed for the GURU to work as it is taught. For example, if a marker is identified by the bot then the task assigned is also performed. So, if the task is weed suppression, and the attached physical payload on the bot is a laser the non-plant/weed is identified, and the laser is turned on and aimed at the center of the marker image region. Prior calibration allows the robot to determine the relationship between the image location and the corresponding physical location to those image pixels. Once aligned the robot performs the weed suppression action (described below) and moves on to the next marker.

The GURUs can be used for a variety of work. Their applicability and usability are virtually endless. A few examples include snow removal, dirt removal, grading, mowing, trimming, weed suppression, pest control and suppression, harvesting crops, perimeter security, weather reporting, ground/earth testing and reporting, animal surveillance and health reporting, keeping stray animal and predators away from local livestock and off the property, security services such as reporting intruders and trespassers, use of non-lethal means to repel intruders, follow along functions, debris removal and cargo movement, ground aeration, and any of a variety of other chores and duties. Below are some more detailed explanations of some of the uses and embodiments of the present autonomous robot system.

Snow Removal

A first application or embodiment utilizing the GURU 502, is a snow removal apparatus 500 that is added to the GURU 502. As noted, there are few robot applications for the typical consumer, but this is, or could be, a consumer-focused product. Thus, the target customers for this embodiment are consumers that spend significant time managing snow during the winter months. This is the vision of this embodiment; however, these bats could be used in larger format in rural areas to dear roads and highways, particularly at night when traffic is at a minimum. But for this application in particular, rural residents with driveways, who currently use manually operated, fossil fuel powered machines, could utilize the bots for continual snow removal. Currently the technology exists to have the robots be responsive up to 0.5 miles, but with time this limitation will be removed, and the robots will have a much greater range.

In this embodiment the GURU 502 uses a snow removal attachment apparatus 503 that removes snow by slowly pushing the snow using a blade 510 or other pushing apparatus of some sort. This snow blade 510 can be a typical, off the shelf blade as the GURU 502 can be configured to accept this type of attachment. Alternatively, the blade could be a custom blade 506 designed specifically for use with the GURU 502 and that more efficiently removes snow. When specifically designed, this pushing apparatus has, in addition to the blade, an orifice 520 or opening for receiving snow. The blade 506 can be designed so that the collected snow is slowly funneled back into the orifice 520 through a snow funnel channel 531 as the GURU 502 slowly moves along its snow removal route. Once the snow is collected by the blade 506 it is then ingested into the orifice 520. Behind the orifice 520 is a melting area 540. In this melting area 540 the snow contacts a heating element 550. This heating element 550 is heated using excess heat from an onboard fuel cell 540 or by some other means of creating heat. Once the snow contacts this heating element 550 it melts, and the resultant water is then ejected and is dispersed in a predefined direction using a spraying apparatus 570. This removes the snow from the route and places the resultant water away from the cleared path. This entire snow removal apparatus can be connected as a singular unit to the GURU 502 or it could be integrated with the device itself.

A key part of this invention using the snow removal apparatus 500 is the use of the on-board fuel cell 530, to both power the GURU 502 and ingest and melt snow, as described above, while moving autonomously, on a 24/7 duty cycle. In this embodiment the GURU 502 with the snow melting capability operates continuously and self-charges, and instead of pilling the snow on the sides of the access roads, it sprays melt water in pre-programmed directions. A pump 551 takes the melt water and sprays it away from the snow removal GURU 502. The melt water is directed away from the surface being cleared, a minimum of 10 feet from the GURU 502, towards a direction specified by the user. This massively simplifies the task of snow management, because snow placement is a large issue. By converting the snow to water, it removes the need for heavy plows, augers, or other moving parts that get stuck or frozen shut. In this embodiment a snow removal gear 560 filters and melts the snow using the excess heat from the fuel cell 530 reaction.

In one embodiment this snow removal apparatus is methane fueled. In this embodiment there is a methane fuel cell 590 and a custom designed methane snow blade 597 with a grid of pipes 591 that circulates hot water 592 (over 400 degrees Fahrenheit) through the pipes 591. There is also a water collection basin 593 located near the rear side of the methane snow blade 597 that collects and melts snow using excess heat from the methane fuel cell 590. Finally, there is a system of methane spray pipes 598 and methane spray pumps 599 that spray away excess melted snow water from the GURU 502 and its path.

There can also be a battery powered variant of the snow removal device that includes all of the above features from the methane version but instead of using methane as fuel it uses a battery 581. The battery version also features an inductive charger plate 582 on an underside of GURU 502, so that the bot can charge wirelessly via inductive charging.

The goal for autonomous snow removal is to prevent snow accumulation on roadways without human intervention. An autonomous snow removal GURU 502 continuously removes snow when it detects snow fall. Obviously, snowfall can be detected using one or more of the onboard sensors, such as the camera or may be a moisture sensor that senses snowflakes. The GURU 502 is ideally battery powered and self-charges using solar power from either the onboard solar array 580, or magnetic inductive charging via the inductive charger plate 582 at the base station system inductive charging port 583, or with the base station or fueling port 503. ideally the autonomous robot system also has a separate solar array 581 located at the fueling port 503 that continually charges the system recharging battery 505.
Follow Me Bots Another use for the Robot system is that of cargo transportation through a "follow me" function. The same GURU, in all seasons, can perform a "follow me" function, pulling a trailer so the human owner can have the GURU follow them around, place subjects (produce, weeds, logs, heavy items) in the trailer, then instruct the GURU to "go to" a pre-learned destination. This trailer ideally is designed to work specifically with the hot but could also be a general trailer that is configured to work with the GURU or where the GURU is configured to work with the trailer.

A key part of this embodiment is that the GURU will not only follow the user, using machine vision, and/or wireless beacons, but will also autonomously navigate to pre-learned locations and "dump" the items, then return to the owner.
Weed Bots The next three embodiments of this invention involve means, apparatus and systems to control weeds, to control pests and to harvest crops. The process is shown in FIG. 9. All three embodiments utilize generally the same technology, that is, utilizing and controlling an attachment apparatus, such as a focused energy beam, or a mechanical weed drill, or a collecting apparatus, to accomplish similar tasks but with different results. In an alternative embodiment the attachment apparatus is stationary and the GUR mobile apparatus is adjustable. The first embodiment below is for the adjustable attachment apparatus.

Figure 2:
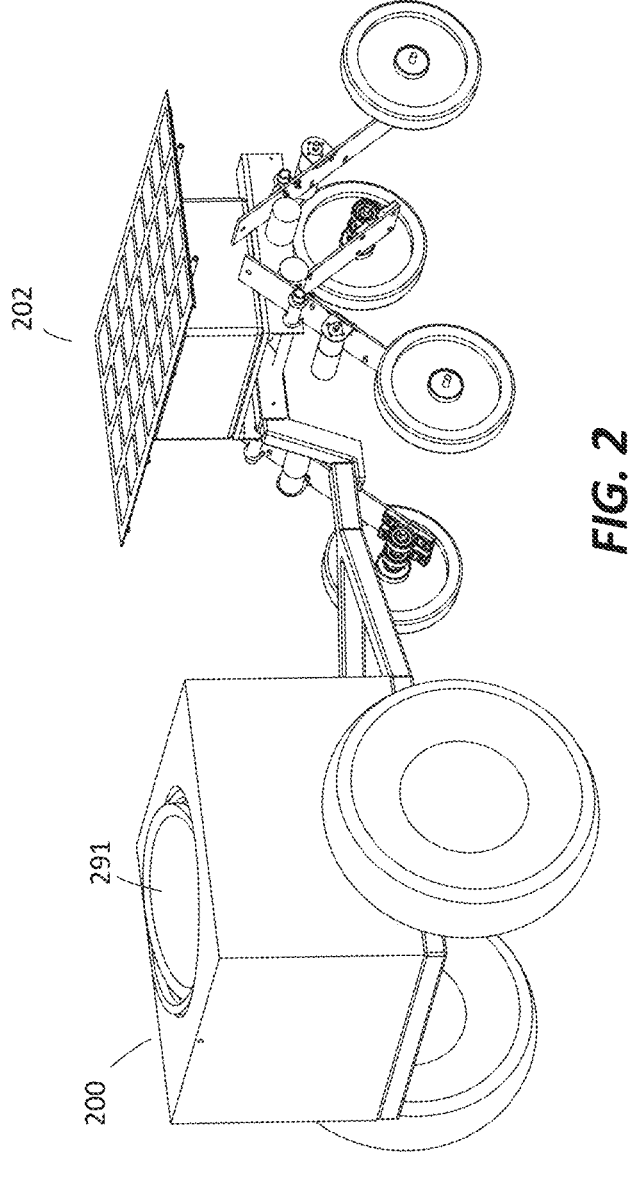
FIG. 2 is perspective view of the GURU of the present invention using a trailer hitch and a trailer hitch attachment.

FIG. 5 is a flow chart showing the parts of the next embodiment. As shown in FIG. 1 this embodiment is a configurable ground utility robot GURU 202 having at least the following parts: an all-terrain mobile apparatus 210; a payload accepting apparatus 261; an onboard processor 221, as also shown in the diagram at FIG. 8 and flowchart in FIG. 9; at least one sensor 240 that communicates with said onboard processor 221; at least one energy beam payload device 290 connectable to the payload accepting apparatus 261, capable of creating an energy beam 294 having enough power to elevate an internal temperature of a subject 299 when the energy beam 294 is Focused on the subject 299 and where the energy beam payload device 290 communicates with the onboard processor 221. The ground utility robot 202 also has a computer program 220 that at least performs the following functions: receives and interprets data from the at least one sensor 240; controls the mobile apparatus 210; focuses the at least one energy beam 294 on the subject 299; and controls the beam strength and time duration. Furthermore, this configurable ground utility robot 202 has an adjustment apparatus 297, controlled by a computer program 220, that is capable of moving and positioning the at least one energy beam payload device 290. The energy beam is typically one of a variety of beams, including a laser or infra-red beam 295, a lens 291 focused light, as shown in FIG. 2, a microwave beam 293, or a microwave emitter 292. This GURU 202 has an onboard solar array 280, an onboard fuel cell 230. Also, there can be a variety of sensors, including a camera 241, an infrared camera 242, motion sensors 243, Lidar 244, microphones 245, Audible devices 246, LED lights 247, and a GPS system 248. The GURU in this embodiment is used for weeding and the subject in this case is a non-crop or weed. However, it could also be a bug or pest. The configurable ground utility robot of this embodiment can also be used as a crop collecting apparatus, where the subject is a crop stem, and where said energy beam is used to cut the crop stem so that a crop can be placed in the crop collection apparatus 249.

This first Embodiment is a weed suppression system 200 having an energy beam control system that uses the focused energy beam 294. In this embodiment the GURU 202 is capable of negotiating varying terrains, the onboard processor 221 with onboard software 220, the at least one sensor 240 affixed to the mobile apparatus 210 (part of the GURU 202) that communicates with the onboard processor 221, the at least one energy beam payload device 290 capable of creating the energy beam 294 having enough strength to elevate an internal temperature of a subject 299 (in this case, a non-plant) when the energy beam 294 is focused on the subject 299 and where the energy beam payload device 290 communicates with the onboard processor 221, further having an adjustment apparatus 296, or turret or other adjusting device, connected to or part of the at least one energy beam payload device 290 or, in the alternative, connected to or part of the mobile apparatus 210, to position the energy beam payload device 290 so that the energy beam 294 can focus on the subject 299, and the onboard computer program/software 220 that runs the weed suppression system 200 performs at least the following functions: controls the mobile apparatus 210; receives and interprets data from the at least one sensor 240; controls the adjustment apparatus, which might be the robot itself 296 to move and position the at least one energy beam payload device 290 so that the energy beam 294 from the at least one energy beam payload device 290 is focused on the subject 299; and controls the beam strength and a duration of the energy beam.

This weed suppression system 200 could use a tractor or other man-controlled devices to move about the growing area, or territory. However, the preferred means of moving the system around the territory is to use the Ground Utility Robot (GURU) 202 described in detail above. As set out above, this GURU 202 can be used for many different chores, including assistance with weed control, snow removal, moving cargo around, monitoring weather, security, predator control, pest control, harvesting crops, or any of a variety of tasks. In this embodiment the GURU 202 is used in part to move the weed suppression system around the territory. The present invention consists of the software and hardware that identifies the subject, or here, non-crop 299, approaches it in challenging terrain (it can be hillsides or any other terrain) and then uses the energy beam 294 to suppress or destroy the crop. The GURU 202 can be of a variety of forms, such as the insect-like apparatus that uses insect-like locomotion via the insect leg articulation, to focus the energy beams to suppress destroy the non-crop 260, or it could be the wheeled mobility apparatus as described above, or any other configuration that allows for mobility around the varied terrain.

Specifically, in this embodiment there is an autonomous robot system 1 having at least one autonomous, field deployable robot, or GURU 202, zero or more fueling docking ports 103, software 220 that will allow the GURU 202 to navigate in either a structured or unstructured environment and where the GURU 202 uses the energy beam 294 from the energy beam payload device 290 to remove weeds. The GURU 202 in this embodiment is programmed to identify and discern weeds from crops so as to not destroy all the crops but rather, to destroy only the offending weeds. And more specifically, the system is designed to really only identify the crop. There are hundreds of types of weeds and thus programming and learning all the weeds is difficult and unnecessary. What is really only necessary is to identify the plant that is not be killed, suppressed or inhibited. In this way the system will attack anything that is recognized as non-crop 299 and because of this simplistic solution the software must only recognize crop and non-crop. The GURU 202 of this system uses a focused energy source to eradicate the non-crop 299. In this particular embodiment it should be noted that it is the energy beam payload device 290 that is adjustable. In order for the system to work the energy beam 294 must be focused on the subject non-crop 299. In this configuration the GURU 202 works in conjunction with the energy beam payload device 290 to focus the beam. This is accomplished by the GURU getting in place and the payload device moving to focus on the weed. In a later described embodiment the GURU itself is the adjusting device.

Currently many systems designed to remove or kill weeds use either chemicals to kill or mechanical action to attempt to uproot and remove the weed from the ground. These two current systems are ineffective for several reasons. First, the chemicals can harm the other plants and more importantly they can harm humans who consume the crops. Second, it is not guaranteed that the chemical will actually kill the weed. Third, it is not environmentally friendly to use chemicals for farming. With respect to the mechanical apparatus and weed removal, again, it is not guaranteed that the weed will be removed and killed, and there is a danger that when trying to remove the weed that the crop will mistakenly be removed as well. The present application also utilizes a mechanical weed removal application but contrary to the existing art, uses a different type of weed and plant identification system in order to prevent plant damage. The presently described embodiment, however, uses a non-chemical, non-mechanical means to eradicate weeds.

In this second embodiment, as shown in FIG. 4, the GURU 202 itself is configured so that it can move its body to align the focused energy on the non-crop 299. The GURU 202 is nimble enough and has enough ability to position and align its body to focus the energy on the selected non-crop 299. The GURU 202 can be any of a variety of configurations, but two envisioned options are set out herein. One, is the GURU 202 described above having the chassis, electric motors, the mobility apparatus (such as caterpillar tracks or wheels), onboard sensors, electronics, fuel cell, etc. and a means to connect the energy beam payload device 290 to the GURU 202. This device also can include a linkage chassis 116 and pivoted suspension 117. These two particular apparatus, along with other types of adjustable apparatus, allow the GURU 202 to have an adjustable height and a unique configurability. In this configuration there is the configurable ground utility robot 202 having an adjustable all-terrain mobile apparatus 210; an onboard processor 221; at least one sensor 240 that communicates with the onboard processor 221; at least one payload 262 secured to the ground utility robot 202; a computer program 220 that at least performs the following functions: receives and interprets data from the at least one sensor 240; and adjusts movement, height and position of the adjustable all-terrain mobile apparatus based on the data so that said payload can execute a task. In this embodiment the configurable ground utility robot also features the linkage chassis 116 and the pivoted suspension 117 as set out above. This allows the device flexibility and adjustability. Furthermore, in the preferred embodiment the payload is an energy beam 294 and the task is weed or pest suppression. However, it could also be used for harvesting. Ideally, the energy beam is a laser, a lens focused light, an infra-red beam, a microwave beam, or a microwave emitter and this GURU is controlled by the computer program to adjust the GURU so that the GURU is used to position the energy beam payload device. Moreover, it also desirable for the configurable ground utility robot to have an onboard solar array 280 and an onboard fuel Cell 230.

Although it is preferable to use the energy beam for weed and pest eradication, it is also possible to use a weed drill 298. In this configuration the payload is the weed drill 298 and the adjustable all-terrain mobile apparatus 210 is controlled by the computer program 220 to position and control the weed drill 298 payload device. The weed drill 298 targets the identified weed and cleanly separates, lifts and removes the weed from the ground.

In yet another configuration, a GURU 223 has an insectoid body featuring a main body or chassis and a variety of legs 122 that allow for mobility over a variety of terrains. The energy powering the energy beam 250 can be from a variety of sources, but it is desired that the energy come from an infra-red source, a laser source 295, a microwave beam 293 from a focused microwave emitter 292, or even from focused sunlight by using a simple optical lens 291 as described above.

When shaped as the field deployed arachnid bodied GURU 223 the GURU 223 ideally carries its electronics and fuel source inside a central body (similar in shape to a spider). The insect-like legs 222 allow the GURU 223 to navigate unstructured, inclined terrain with a minimum footprint and surface contact area, as to not disturb the field. This leg configured also allows the GURU 223 to move its body to focus on the identified non-crop 299 below. One of the other unique aspects of this invention and configurations is that it can operate most anywhere. Many previous adaptations and attempts to create weed killing robots rely on structured field configured. This is not true with the present arachnid bodied GURU 223.

The ultimate goal for autonomous weed removal is to eliminate the use of herbicides. The arachnid autonomous robot GURU 223 of the present invention use the insect like chassis, with between two to six long legs of variable length (6 ft nominal). In the center, the "insect body" can carry batteries and/or solar panels, and on the underside, sensors 240, such as cameras 241 for identification of weeds. In addition, as described above, there can be a microwave focused emitter, or infra-red laser (TBD) that destroys the identified non-crop 299.

As shown in FIG. 2, an alternative to micro wave or laser, for high insolation areas is focused sunlight where a large, simple, optical lens is placed in the center of the robot body that focuses sun rays on the non-crop subject 299, rapidly increasing its temperature and essentially burning/boiling the stem, as close to the ground as feasible.

In application, the GURU 202 having the wheeled mobility apparatus, moves slowly across a geo-fenced target location, able to navigate variable, steep or flat terrain. It ideally can deal with both ordered vegetable rows or unstructured fields of plants (wheat, corn, etc). The GURU 202 operates 24/7, with a duty cycle determined by its ability to recharge (either through solar, or inductive magnetic field charging using the base station). As detailed below, the GURU 202 may also be able to return to a fueling docking port 203 when its charge reaches critical level and these docking stations or fueling ports 203 can be either at a central location or scattered about the service area. Multiple GURU 202s operating on large fields will enable early and often weed removal, preventing weeds taking over in clusters, From an operational standpoint, the autonomous robot system 1 is designed to be available to everyone, not just the wealthy or large corporate farm companies. The GURU 202s can be leased and rotated between farms using the above-described reservations system. This design presents a system to lower income farmers that otherwise could not afford to purchase and use the bots or the system. This system can be used by small to medium sized independent farmers, medium to large farms, and consumer gardens (with smaller scale version), and even now other applications and users are continually emerging.

In this present application the user will employ the described GURU 202 to eliminate weeds. To more specifically define the invention set out above, we now describe the GURU 202 operation when used as the weed suppression system. First, the GURU 202s are reserved by a customer using the above-described reservation system, they are then delivered to the customer's site and are placed on a field and are geo-fenced so they know the virtual boundaries of the field using either GPS, visual cues, Wi-Fi beacons or any other type of virtual fencing system. The GURU 202 uses machine vision to identify the non-crop 299, approach it, then tilts its body in such a way that it can focus the direct energy beam 294 from the energy beam payload device 290 that will heat and destroy the subject non-crop 299. The energy beam 294 can be one of many embodiments but below are three specific embodiments that could be utilized for the present application.

First is a focused sun energy using a large (12" or larger) diameter optical lens 291, attached to the GURU 202, that is positioned autonomously by the GURU 202, so the peak energy density is on the stem of the identified non-crop 299. Just a few seconds of intense focused sun energy is enough to heat up and burn the non-crop 299 stem, suppressing its growth significantly. The diameter of the lens 291 could be smaller or larger depending on lens strength, regional sun, or any number of additional variables, but is ideally 12 inches or larger.

A second type of energy beam 294 is a focused microwave emitter 292 that could also be used to heat up the water molecules inside the non-crop 299 (and on its surface) essentially boiling its stem and leaves. The same technology as described above allows us to identify the non-crop's stem and leaves and to then move the GURU 202 so that the microwave beam 293 dispersed from the focused microwave emitter 292 is optimally placed to eradicate or at least slow down the non-crop's growth.

A third energy beam option is an infrared laser beam 295, preferably in the order of 30 W power rating, with a surface area of a few millimeters, again focused on the non-crop stem. Just a few seconds allows the laser 295 beam to burn through the non-crop stem and create holes in the leaves and non-crop body.

Essentially it does not matter what type of energy beam is used to eradicate the non-crop 299, as long as it provides enough energy to destroy the non-crop internally but not enough energy to cause fires.

As mentioned above, a final embodiment would include a mechanical means to eradicate and eliminate weeds. In this embodiment the same GURU 202 is used to align and focus the mechanical apparatus. In this particular embodiment the weed drill 298 is used instead of the focused energy beam. The weed drill 298 attachment is similarly affixed to the GURU 202 as the above-described energy beam payload device 290. However, instead of using one of the preferred energy beams 294 (such as the focused energy from the lens 291, or the focused microwave emitter 292, or the microwave beam 293, or laser beam 295) the present application resorts to a more traditional mechanical means. The difference lies in two important elements. First, the present system uses the sophisticated weed recognition software described above in order to minimize the elimination of plant rather than non-plant. And second, the system uses the new, efficient and proficient weed drill 298 as a means to remove offending weeds. In this embodiment the weed is recognized, the GURU 202 positions itself and the weed drill 298 so that the weed drill 298 can be deployed into the soil. The rotating drill then literally pulls the weed from the ground, preventing future growth of the week. Alternatively, a spinning device, similar to a weed wacker, could be used to cut the weed off as close to the ground as possible.

In brief summary, the autonomous robot system has robots, the computer program to run the robots, and potentially refueling ports or charging ports. The robots from this system are sent out into the field in search of the non-crops. Once the robot identifies the non-crop it uses the energy beam that is emitted from the energy device or the mechanical means to eradicate the non-plant. After destroying the non-crop, the robot moves on in search of the next non-crop. This same system can be used for the suppression of pests also, as will be described next.

Pest Bots

The second application for the above-described GURU 202 is a pest control system having an energy beam control system that uses a focused energy beam 294. As this system is identical to the system used to eradicate weeds the Figure numbering system remains the same, as do many of the descriptions and parts. In this embodiment there is the GURU 202 having the all-terrain mobile apparatus 210, the onboard processor 221, onboard software 220, at least one sensor 240 affixed to the mobile apparatus 210 that communicates with the onboard processor 221, at least one energy beam payload device 290 capable of creating an energy beam 294 having enough strength to eliminate pests when the energy beam 294 is focused on the pest 310 and where the energy beam payload device 290 communicates with the onboard processor 221, further having a turret, or an adjustment apparatus 296 connected to the at least one energy beam payload device 290 to position the energy beam payload device 290 so that the energy beam 294 can focus on the pest 310, and the computer program, or onboard software 220 that runs the pest control system at least performs the following functions: controls the mobile apparatus 210; receives and interprets data from the at least one sensor 240; controls the adjustment apparatus 296 to move and position the at least one energy beam payload device 290 so that the energy beam 294 from the at least one energy beam payload device 290 is focused on the pest 310; and controls the beam strength and a duration of the energy beam.

This embodiment is identical to the first embodiment except for the application and use of the beam. The all-terrain GURU 202 will behave similarly to that of the weed control GURU 202 but rather than heating up non-crop subject 260 the beam will focus on pest subject 310 in order to eliminate the pest.

Obviously, the software will be different as the GURU 202 will now have to recognize a variety of moving subjects, rather than just non-crops subject 299. This can be accomplished in a couple of ways. First, it could be programmed similar to the non-crop application where the GURU 202 could attack anything "non-human" or "non-mammal." The GURU 202 could utilize the sensors to pick up body temperature and therefore only attack pests that have a body temperature lower than mammals. Alternatively, it could be programmed to actually identify a variety of pests. This could be done through an initial data upload, or an initial data upload combined with learning and possibly combined with the human assisted machine learning, as described above. In any case, the process is basically the same. The device identifies the subject, the energy beam is focused and deployed, and the subject is eradicated.

The GURU 202 could also do double duty by suppressing weeds and controlling pests. The GURU 202 could be programmed to move from crop plant to crop plant, suppressing weeds and by eliminating any pests around the crop using a single energy beam. Or, the GURU 202 could be equipped with multiple energy beams such that one or two beams would perform the weed suppression task while other beams would perform pest control.

In most ways the pest control system is identical to the weed suppression system described above except for the task, i.e., eliminating pests rather than suppressing weeds, so a more detailed description of the system will not be included here.

Harvesting Bots. Yet another embodiment that utilizes the energy beam 294 is a harvesting system. This embodiment is slightly different than the previous two embodiments in that the controlled energy beam is used to cut produce from the stem and then the collecting apparatus 249 is used to collect the crops. This embodiment features the configurable ground utility robot 202 having the adjustable all-terrain mobile apparatus 210; the collecting apparatus 294; the onboard processor 221; the at least one sensor 240 that communicates with the onboard processor 221; at least one payload secured to said ground utility robot; and a computer program that at least performs the following functions: receives and interprets data from the at least one sensor; adjusts movement, height and position of the adjustable all-terrain mobile apparatus based on the data so that the payload can execute a task. In this case the payload is a crop stem severing device 252 and the task is harvesting. In this application the crop stem severing device 252 utilizes the energy beam 294 to sever the stem and free the crop. Here, the crop is delivered into the collecting apparatus 249 after the crop stem is severed by the severing device. This apparatus provides a clean, efficient means to harvest low lying crops, and possibly high fruit crops as well, such as apples or grapes or other produce. Ideally the GURU 202 can be used for pest and weed control along with harvesting. As noted above, the desire is to have the systems run entirely on renewable energies, so it is also preferable for the system to have an onboard solar array 280 and the onboard fuel cell 230.

The collecting apparatus 294 can be affixed to the GURU or it could be another GURU that either is attached or just follows the first GURU. Also, it could follow behind and collect the produce or it could lead and collect the produce. This embodiment features an energy beam control system having an all-terrain mobile apparatus; an onboard processor; at least one sensor affixed to the mobile apparatus that communicates with the onboard processor; at least one energy beam device capable of creating an energy beam having enough strength to sever a produce stem when the energy beam is focused on the produce stem and where the energy beam device communicates with the onboard processor; an adjustment apparatus connected to the at least one energy beam device to position the energy beam device so that the energy beam can focus enough energy to sever the produce from the stem; a collection apparatus to collect, hold and transport the produce after the produce stem is severed; and a computer program that runs a produce harvesting system and at least performs the following functions: controls the mobile apparatus; receives and interprets data from the at least one sensor; controls the adjustment apparatus to move and position the at least one energy beam device; controls the beam strength and duration so that the energy beam can cut the produce stem; and controls and monitors the collection apparatus.

As noted, this system is somewhat different from the previous two embodiments and is in some ways more difficult in application. This system would utilize the same GURU 202 as the previous embodiments. It would also utilize similar programming to control the energy beam 294 but rather than using the beam 294 to suppress a weed or kill a pest it would be focused on a plant stem for a long enough time to sever the stem in half, thus releasing a crop from the stem. Again, the beam 294 would have to be controlled enough to just cut the stem and not harm the plant or cause fires in the crop field.

In addition to the cutting procedure this embodiment would have a collection apparatus 249 to retrieve the crops once severed and cut from the stem. This system would require some means to collect the crops, i.e., fruits, nuts, etc. and place them in the collection apparatus 249. The programming would be somewhat more complicated as the system is now not just destroying weeds or pests but is working to not injure the crop and then collect the crop after it is separated from the stem.

Autonomous depredator and predator identification and conflict reduction system. Another embodiment or use for the GURU 202 is as an autonomous depredator and predator identification and conflict reduction robot. Another benefit of the 24/7 duty cycle farming robot is the ability to identify depredators and predators, for example, using a camera and or a thermal infrared camera, a microphone, motion sensors and then using noise, light, odors, taste, vibration or other non-lethal or lethal means to prevent them from engaging in unwanted behaviors (for example, getting dose to, entering or being in a geo-fenced area, including above or below such area). The GURU 202 can be used for a variety of depredator and predator deterrents, including those that could attack crops, those that could attack other animals, those that could attack humans, or those that might be planning or are engaged in some unwanted or illegal activity, for example, trespassing, theft, vandalism, or destruction of property.

In order to deter predators or depredators that attack and eat crops, such as crows, blackbirds, rodents, rabbit, deer, insects, pests or other predators or depredators that threaten to or cause harm to humans, animals and/or property (e.g., wolves, bears, wild asses, wild horses, humans, insects, pests), there are one or more repellants or deterrents that can be used, for example, odor-based repellants, taste-based repellants, sound-based repellants, vibration-based repellants, touch repellants and visual repellants. In some embodiments, these repellants are designed to elicit or trigger responses and/or reactions (e.g., fear) in the predators or depredators. For example, the robot applies odor and/or taste-based deterrents to the crops through spray, drops or some other means. In some embodiments this is done in conjunction with (or approximately contemporaneous with) other daily activities such as eradicating weeds and pests. In some embodiments, a deterrence strategy may use more than one type of repellent. For example, a repellent may have one or more ingredients that produce both a foul odor and also include one or more ingredients that reduce a plant's gustatory attractiveness. In another example, a repellent may include one or more ingredients designed to deter more than be one species of predator and/or depredator. There are many repellants available that are entirely natural and do not use any chemicals whatsoever and these would be the preferred type, but of course any available type of repellant is acceptable and useable.

There are a variety of ways to implement this autonomous depredator and predator detection and/or identification and conflict reduction system. In a first embodiment, there is a configurable ground utility robot 800 having an all-terrain autonomous mobile apparatus 801 that can navigate in both structured and unstructured environments, a processor 830, that can be either onboard or in the cloud, at least one sensor 840 that is communicatively connected with the processor 830, a computer program 850 that at least receives and interprets data from the at least one sensor 840 and controls the mobile apparatus 801, there is at least one control device 810, and the ground utility robot 800 may be powered by renewable energy. In this first embodiment the ground utility robot 800 has a variety of parts that make up the entire robot. This is fully described above and so will not be repeated here. In this embodiment however, it is important that the ground utility robot 800 be able to navigate in unstructured spaces, such as in fields, pastures, grasslands and wild areas (that have myriad obstacles which may be fixed or dynamic), and difficult terrain to traverse. The robot 800 must do this because in this configuration it can act as a sentry and therefore is not restricted to travelling only in fields, rows, roads or paths.

This embodiment contains the control device 810 that serves to distribute, implement or effect the deterrent. The robot 800 can have one or more control devices 810 at its disposal. In some cases, the robot, rather than or in addition to the control device 810 may serve to distribute, implement or effect the deterrent. In all instances the deterrent is designed to elicit a sensory reaction or response by stimulating one or more of the depredator's or the predator's sense. As such, the control device is a sensory controlling device. More specifically, the sensory controlling device can be one that can control, or, more precisely, can act as a deterrent through any senses: sight, touch, smell, sound and taste and/or any other senses that any predators or depredators have. In all of the embodiments the at least one control device performs an action designed to elicit a sensory reaction in the depredator or the predator. Several exemplary deterrents are described below. The authors recognize and there are many embodiments that can achieve desirable results and, even if not fully described herein, the authors intend this disclosure to be understood to include all of them.

Historically farmers have used visual deterrents to dissuade depredators/feeders and predators and feeders from attacking and eating their crops and animals. Birds, such as blackbirds, crows, grackles, starlings and others eat insects, but they also feast on seeds and crops. In addition to aviary attack, plants are subject to land attack by deer, rabbits, racoons, squirrels, and many other animals and rodents. In order to prevent this, farmers have used a wide variety of deterrents in a never-ending attempt to stop the depredators and predators. These include scarecrows, aluminum screening, hardware screening or cloth, plastic netting, paper bags, stakes and flags, stakes and string, mylar streamers, fishing line and worst of all, chemicals. The problem with all of these approaches is that they are time consuming to install and remove, they are a nuisance to the farmer and in some cases, can be harmful to the crops and even humans. Because of this and other problems the present invention exists.

FIGS. 11-24 show a Sky Puppet and the different ways and means of implementing the Sky Puppet with the robot. One specific type of visual deterrent is an apparatus that visually threatens or scares a depredator or predator by its movement, such as a windsock, skypuppet, air puppet, sky dancer or variants thereof. Such devices are often used outdoors for advertising purposes (e.g., outside of car dealerships or other businesses and are used to advertise sales or special events). They can also be used as a stationary device, where the location of the base of the apparatus does not change, to scare birds and other predators. The prior art for such apparatuses typically includes an electrically driven motor 821, a fan 822 and a windsock 823 or skypuppet sock. The power drives the motor 821, the motor 821 turns the fan 822 and the fan 822 fills the windsock 823. The sock 823 then flops, moves, and dances around in order to, for example, attract customers or scare birds. The basic apparatus for the skypuppet 819 in the present invention is shown in FIGS. 11 through 24. It includes a motor 821, a fan 822 and the skypuppet windsock 823. The present invention incorporates the ground utility robot and adds constant moveability and roaming ability to the skypuppet 819. When attached to the robot 800 the skypuppet 819 moves as the ground utility robot moves, thus increasing the efficacy of the threat or scare because, for example, the distance or angle between the skypuppet 819 and the predator can be controlled There are multiple ways to affix or attach the skypuppet 819 to the ground utility robot 800. FIGS. 17-22 show one embodiment in which the skypuppet 819 is directly attached to the ground utility robot 800. In this embodiment, the skypuppet is affixed on the top or on any of the sides of the robot 800. In these figures the skypuppet 819 is attached to either a caster or a wheel side of the robot 800. Both sides of the robot 800 can have a receiver type hitch mount that utilizes a shaft 950 and a receiver 940 where the receiver is incorporated into or affixed to the robot 800 and the shaft 950 can be part of the skypuppet 819 so that the skypuppet unit 819 is easily attachable and removable from the robot 800. Although a shaft and receiver apparatus is used in this configuration, other attachment means can be used to secure the skypuppet to the ground utility robot. It is also possible to incorporate a mount to secure the skypuppet 819 directly on or slightly above a solar panel 870. This is not preferred as it may impede light from reaching the solar panel 870, but it is possible. In any of these configurations it is also preferable to have the electric motor 821 and the fan 822 incorporated together in a box 824 type design with the skypuppet sock 820 extending from the box frame 824, as is shown in the Figs. That is, the motor 821 and fan 822 at the base of the unit and the sock 823 extending upwardly from the base unit 824 so that the wind generated by the fan 822 fills the sock 823. The skypuppet 819 unit including all the necessary elements is preferred as it makes attachment and removal easy.

In a second embodiment, shown in FIGS. 11-16, 23 and 24, the skypuppet is not directly affixed to the robot but is part of a trailer 900. In this embodiment, the trailer 900 is pulled by the robot 800. This trailer can be a standard off the shelf trailer with a box, an axle, wheels and a tongue where the tongue extends towards and is attachable to the robot 800. Attachment can be made using any number of connection means, including a standard ball hitch using a shaft 950 and receiver 940 where, as above, the robot 800 already has the receiver 940 and the shaft 950 can be a part of the trailer 900. Alternatively, the robot could have the ball and the trailer tongue would simply fit over the ball and connect using the standard ball mount. In this trailer configuration, the skypuppet 819 would sit in or be attached to the trailer 900. Alternatively, as is shown in FIGS. 23 and 24, a special trailer has the skypuppet 819 built into or incorporated directly into the trailer 900. It is preferable to have the trailer pulled by the robot 800 but, if configured properly, it could be pushed. It should be noted that any of the control devices described herein can either be connected directly to the robot or can be trailered.

For many of the control devices 810 power is required. The control devices can pull power from the robot or they can have their own power source. In most other embodiments, and in this particular skypuppet embodiment, the control device must be powered in some way and there are several ways to accomplish this task. The first, and preferred method, is to connect the control device-skypuppet 819 to the robot 800 and where the robot powers the skypuppet. This can be accomplished with one or more cables 825 so that the robot powers the control device. The robot is ideally 100% powered by renewable energy. As a result, the control device is also 100% powered by renewable energy. As explained herein, in the preferred method, energy comes from natural light collected by the attached solar panels 870 as shown in FIGS. 11, 12 and 14. That energy is then stored in an onboard energy storage apparatus, such as a battery 880, and the energy from the battery 880 drives both the robot and the control device, such as the skypuppet. This battery could be recharged from the grid, but again, it is better to use all renewable energy when possible. In other embodiments the control device can have its own energy source. This could be in the form of a battery, a generator, a gas motor, or any other form of energy that could power the control device. It does not matter if the device is a sky puppet, lights, horns, or whatever, even though it can have its own energy source it is preferred that the power to operate the control device comes from the robot and thus from the renewable energy source.

In all of the skypuppet embodiments, the skypuppet inflates (partially or fully) and threatens/scares birds and other depredators and predators causing their dispersal. This threat/scare feature is more effective when the robot can move and can navigate a variety of terrains. As noted, the robot is not limited to travelling in rows or uni-dimensional areas only. It is an all-terrain apparatus that can navigate in both structured and unstructured environments. Also, it is even more effective because it is possible for the robot to react to different situations. For example, if a flock of birds is detected through input received by the one or more sensors 840 and which is communicatively connected to the processor 830 (the processor may or may not be co-located with or be part of the sensor), the processor will formulate a response (e.g., generate a command directing the robot to turn and head in the direction of the flock) in order to disperse the flock from the crops. The system may then continue to respond, such as by following the flock around the field until they have left the area. Likewise, if a threat is perceived or a defensive action is required, the robot will proceed to perform the defensive action, such as retreating or changing course away from the threat. The system is also designed to learn as it works. For example, if the system records a better result from circling a field rather than going up and down rows then it will incorporate that action into its pattern of movement and be more likely to apply that pattern in order to eliminate/mitigate/control the depredator or predator more effectively in the future.

In other embodiments, the robot can also use noise and/or light, to threaten/scare/repel a predator. The robot can be instructed to dissuade and prevent predators from entering a controlled area through the use of loud noise (this noise may be at frequencies that are audible or inaudible to humans), and/or lights patterns (wavelength, flashing pattern, direction). These same deterrents can be used to deter depredators and predators that are in position to damage, eat or destroy plants, attack livestock or other animals, humans and other property.

In the light generating embodiment, the control device 810 uses light control 826 to deter or prevent birds and other depredators or predators from harming or destroying crops. The light control 826 can be any type of light, at any intensity, any frequency, any flashing pattern, and use any light producing technology in whatever mode or manner. In any of the configurations described herein it should be recognized that the robot is not limited to having only one deterrent onboard. For example, the robot 800 could have the skypuppet 819 trailered behind and could have a variety of lights 826 attached onboard and the two types of control devices (i.e., skypuppet and light emitters) can work together to deter, prevent, and eliminate any perceived threat.

In another embodiment shown in FIGS. 11-16, the visual control device is a windmill 827 having one or more blades 828. It is possible that forward motion of the robot 800 may be enough to turn the one or more blades 828 of the windmill 827 or naturally occurring wind may also be enough to turn the blades 828. This is a very simple apparatus and when designed correctly does not require any outside power to drive the blades. In a preferred embodiment the windmill 828 turns via either naturally occurring wind or from the robot motion and this movement then generates power that is fed back into the robot and the onboard storage apparatus. This power is then used to drive the robot and or other control devices. In an alternative embodiment, the windmill has a motor 821. This motor 821 is connected to the blades and can be used either alone or in conjunction with the wind to turn the blades. The blades can be any color, texture or design. They can be brightly colored, reflective or even lighted. The blades 828 could have streamers, strings or other apparatus attached to them that would spin with the blades adding even more of a deterrent to the device. Any blade configuration or design imaginable is acceptable. The main goal is to scare or frighten away depredators and predators, but the windmill could also be used as advertisement or decoration if desired. This also applies to the skypuppet configuration. The main goal of the present invention is to scare, deter and prevent predators but again, the skypuppet could be designed and used for marketing and advertising as well as for scaring predators.

In another embodiment, the control device is a sound or noise device 818. In this embodiment, the sound device 818 can be any sound producing apparatus, including but not limited to a whistle, siren, horn, bell, or any other noise producing apparatus. The noise device 818 can be one capable of producing sounds perceptible to humans, but it might also produce sounds at any intensity and at any frequency (human audible or not) and any modulation. Such intensities, frequencies and modulations may be controlled based upon the type of depredator or predator (e.g., different frequencies for different depredator or predator types) and/or type of threat (e.g., more intense sound when threat is greater). The apparatus is designed to deter depredators and predators and it can be targeted to specific depredators or predators, such as wild dogs, coyotes, wolves, or other wild animals. Many animals are capable of hearing ultra-sonic sounds and sounds that are not perceptible to the human ear. Thus, the sound device 818 is not limited to any range. As described above, it is possible that the sound producing apparatus 818 be powered by the robot 800 or it could have its own energy source.

In yet another embodiment, the control device is a scent producing device 817. In this embodiment, the scent device can be any scent producing device 817, e.g., a spraying apparatus that can spray scented liquids or disperse scented mist. The scent can be any scent that would turn away depredators or predators and can vary based on the type of depredator or predator detected. For example, scent deterrents are particularly effective with deer. These deterrents can, for example, be scents that interfere with the animal's sensitive sense of smell (such as aromatic soap bars and other aromatic scent means) or scents that the animals interpret to indicate danger (e.g., scents that are associated with their predators). In some embodiments, these scents can be sprayed while the robot travels and the scents can and are changed easily and frequently. This is advantageous because deer and other animals are generally afraid of anything new, yet they learn quickly to adapt, so it is beneficial to utilize multiple scents and to change them frequently. By applying early and often this type of deterrent can keep predators at bay. This scent producing control device is extremely simple and can be incorporated with one or more other control devices described herein, such as a sound control device and/or a visual control device.

In another embodiment, the control device is a touch device 816. In this embodiment, the touch device 816 can be any apparatus or device that can take action (e.g., throw, toss, eject, shoot propel, cause vibrations) designed to affect the depredator's or predator's sense of touch/feel. These apparatus or devices can include but are not limited to bags, bean bags, spears, arrows, Chinese stars, darts, bullets, vibrations or any other projectile that can be shot or dispersed. Similar to other embodiment described herein, the touch producing apparatus 816 can be powered by the robot 800 or it could have its own energy source and/or its own firing mechanism. It is also envisioned that the touch device 816 be controlled by the ground utility robot 820. In this embodiment too, the goal is to scare or frighten away depredators and predators, so the sensors perceive the threat, the threat is communicated and then the touch response to the threat is activated. This response could be to throw or eject bags at the predator, it could be to shoot a projectile, or it could actually be to fire a bullet from a gun or other lethal device. All this is done in response to the perceived threat.

In other embodiments, the robot 800 can serve as a security system to prevent prowlers and unauthorized persons from breaching a perimeter or alert to breaches thereto (e.g., noise, light, odor, touch, messaging to people or other systems). This can be done by using motion detection where, if motion is detected, and a person identified, the robot takes an action (e.g., sends an alert to the owner, alerts a security provider, activate alarms, trigger sirens, or even calls 911. The robot can also use lights, lasers, sirens and horns as an initial means of warning and scare tactic. Then, if the robot still senses motion or danger it could alert the Control Company or the Police. In addition, the system can include facial recognition to recognize known users, such as security provider employees, or the owner, in order to prevent false alarms or warning.

In another embodiment, the robot 800 can be used for border security. For example, as the U.S. continues to build a southern border wall, the robot 800 can be used as a sentry to prevent illegal entry across the border and to protect the perimeter and add security to the border line. As described in other embodiments detailed herein, the system can employ one or more of the sensory deterrents. And, as also described elsewhere herein, the system could include both lethal and non-lethal deterrents.

All of the above systems, apparatus, control devices and embodiments use a similar method to accomplish a goal. That goal throughout is to control or patrol an area, to monitor crops, and overall to provide a method of controlling the area by preventing crop depredation through systematic removing, controlling or scaring predators. This method generally uses the following steps to accomplish these goals. All the systems start by having an all-terrain, autonomous, mobile apparatus 801 capable of navigating in both structured and unstructured environments. This configuration gives the mobile apparatus 801 the ability and capability for patrolling, monitoring and securing the area with a main goal of preventing crop depredation, and removing, controlling or scaring predators. The mobile apparatus has at least one sensor and the mobile apparatus 801 then has at least one control device 810 that is attachable to the mobile apparatus 801. As described above, the control device is not limited in any way and can be any sort of sensory device but generally is one that elicits a sensory response to a stimulus, such as sight, sound, smell or touch. This at least one control device 810 is attachable to the mobile apparatus 801 and that means that it can be attached in a number of ways. For example, it could be mounted directly onto the front, rear or sides of the mobile apparatus 801. It could be mounted and above mobile apparatus, such as to the solar panels 870. Or it could be pushed or pulled by the mobile apparatus 801 via a hitching mechanism of some sort. As above, the mobile apparatus is ideally powered using a renewable energy power source. This could be solar power, wind power, regenerative braking power potentially stored in an onboard battery 880 or other power storage apparatus. However accomplished, it is preferred that the entire device not use fossil fuels and be powered by renewable energy. The apparatus finally has at least one sensor and a processor where the at least one sensor is communicatively connected to the processor. Once the parts are assembled and are operational the robot 800 goes to work patrolling, securing and monitoring the areas thus preventing crop depredation and removing, controlling and scaring predators. As the robot is patrolling the at least one sensor is sensing and perceiving one or more values from its surroundings. After perceiving the one or more values then passing or sending those values to the processor whereafter the processor is receiving, analyzing and processing the one or more values. After receiving, analyzing and processing the perceived values then determining if an actionable pattern exists. If an actionable pattern exists then determining an action, and after determining an action, sending action instructions to the at least one control device and the at least one control device responding to the received action instructions and ultimately performing the action in response to the instructions.

The method and steps set out above are followed no matter what control device is utilized. This is generally the course of action taken by the system to achieve its tasks and goals, and that is, to elicit a sensory response from the depredator or predator. There are additional steps that can also be followed to even further increase efficacy. In order to achieve better results they system can utilize the perceived values and determined action patterns and then the system can automatically position the at least one control device to maximize its effectiveness. These actions and movements can be pre-programmed or they can be learned as the system encounters, observes and records data. The automatic positioning includes a number of actions. For example, it could mean moving the control device, via the robot, across a field so as to move in the direction of a depredator or predator. If it is found that circling or moving towards and then away from the depredator or predator is more effective then it will take those learned experiences and will apply them to its movements. It could mean rotating, raising, lowering, turning, spinning, focusing, channeling, angling or just moving the control device and its direction and or position. For example, it could mean directing a light or focusing sound at the depredator or predator. In short, any repositioning, moving or adjusting the control device is possible in order to maximize effectiveness.

As a concrete example, these methods and steps can be applied to the skypuppet embodiment. In this unique configuration the control device is a skypuppet 819 and the skypuppet is generally made of three parts as set out above, the motor 821, the fan 822 and the windsock 823. It could also include the base unit 824 and connection cables 825. The robot 800 in the most preferred embodiment also includes the solar panels 870 and the battery 880. In operation the system is collecting light via the solar panels 870, storing the energy collected at the battery 880, powering the motor 821 via the battery 880, turning the fan 822 with the motor 821 and inflating and filling the windsock 823. These steps act to power and drive the skypuppet. Ideally the skypuppet is powered via the robot 800 but it is possible that the skypuppet could be self-powered. For example, the base unit 824 could include its own power source, such as a separate battery or a generator or some other means to power the skypuppet.

In this embodiment the skypuppet is attached to the robot, either directly affixed to the robot body or is trailered behind or in front of the robot. As above, the system is perceiving values from the at least one sensor, it is passing the perceived values to the processor, it is then receiving, analyzing and processing these values and is then determining if an actionable pattern exists. If a pattern does exist then it is determining an action to be taken in response to that pattern. The skypuppet is thus moved around the area to be secured, monitored or patrolled and can act proactively or in response to perceived values. For example, if the at least one sensor is perceiving a flock of birds at an opposite end of the field, and if it is determined that the birds are attacking and eating the crops, then the processor will receive, analyze and process these values, recognize the actionable pattern and may move the skypuppet towards the flock of birds. This is just one example and the patterns and actions are not limited by this description.

As above, the control device can be any of a variety of devices that are all designed to elicit a sensory response by stimulating the depredator or predator's senses. These can be any of the depredator or predator's senses. That is, it can be an action designed to elicit a sensory response by stimulating the depredator or predator's sense of vision, hearing, smell, taste or touch.

Weather station and Soil Testing. In another embodiment, the robot is used to monitor and report weather and environmental factors (e.g., soil characteristics) for use by different parties (e.g., security provider, agricultural optimizers, weather stations, governmental agencies, data collection centers, or anyone wanting access to his information, either on a free or paid for basis). The robot's sensor suite already provides key telemetry per robot, and stream processing by remote peers can produce detailed weather/hydrology data available for farming optimizations. Along with reporting weather, the robot can compile, store and analyze the collected weather data. This information will provide useful data to the user through weather patterns, rain fall measurements, temperature measurements, humidity measurement, and a variety of other measurements that will assist in successful growing seasons and better crop production. The robot can also take soil samples and perform soil testing as it roams the fields. Samples can provide a variety of information, depending on the type of sensors utilized. For example, information can include color, compaction, soil moisture content, organic content, pH, profile, structure, temperature and texture, just to name a few. These tests help establish organic matter, erosion factors, aeration, available nitrogen and soil fertility. These tests can determine soil fertility, or the expected growth potential of the sod which indicates nutrient deficiencies, potential toxicities from excessive fertility and inhibitions from the presence of non-essential trace minerals. Labs typically recommend 10-20 sample points for every forty acres of field and they recommend creating a reference map to record the location and quantities of field samples in order to properly interpret test results. Something that used to be done manually can now be done by the GURU 202 with better tracking, sampling and mapping. In some embodiments, testing is also performed on-site using onboard software and processor. This eliminates the need to remove the soil from its natural ecosystem, thus preventing any chemical changes that might occur during a move and associated logistics (e.g., effort, cost, time). Having sophisticated software and computer systems in the field removes the need for "do-it-yourself" testing kits and provides a much more robust and thorough analysis. If the robot or one or more additional robots work in adjacent fields, it would also be useful to compare the soils in the region. The testing is included with or could be purchased in addition to the standard tasks assigned to the robot.

AI LEARNING. In some embodiments, the GURU 202 is connected online (or can periodically upload data) and can learn (e.g., ML, crowdsourcing), between one or more robots, of all weed suppression images and actions, pest data, predator data and weather data. The GURU 202 can upload images of all plants, animals, predators, weather conditions, soil conditions, soil tests, and environments it experiences, along with its actions. A machine learning platform processes the inputs (sensor data) and outputs (robot actions) and using reinforcement learning it modifies the parameters used by all GURU 202s, to identify plants, pests, move, control the robot's actions, etc. This feedback control system uses data from all the active robots and closes the loop by adjusting configuration parameters, and code, on some or all the robots. In some embodiments, the robots can self-update when new parameters or code is available.

Energy Supply. Ideally, the bots will run entirely off the on-board solar arrays. However, it is envisioned that they could be powered from a variety of sources. Ideally however, they will be entirely free of the grid and will work off renewable energy sources at their location. This can be accomplished through a variety of sources and methods, the full chain of energy capture, storage, distribution, and use in mobile robots is described next. The energy source for the robots could come from a singular source or it could be a combination of a variety of sources. These could include solar, wind, hydro, thermal, regenerative breaking, but this system could also feature a hydrogen or methane economy that provides a net positive benefit to the environment and its users. To achieve this lofty goal of independence the system must be able to capture enough energy to keep the robots operational and to keep the entire system operational. This can be accomplished through a variety of energy capture systems that include but are not limited to the following.

Solar. As shown, each customer deploying one or more robots is offered a fueling port 3 equipped with properly sized solar panels 80 and possibly a battery 5 within the fueling port 3 to store excess power that can then be sold back to the grid or to use when solar generation is not available. The solar array 80 solar panels ideally are flexible panels at least 2 W minimum. If possible, the station is grid to offer net metering benefits. The battery 5 is present to provide buffering of energy during low insolation intervals. It is entirely possible that the robots could be free of charge or at reduced service rates in exchange for the control company's ability to sell back power to the grid. This is beneficial to both parties.

The bots can autonomously recharge by returning to the fueling port 3. The fueling port 3 is equipped with a square weather/waterproof floor mat, placed over a level surface. Ideally the mat is approximately 24"×24", depending on the size of the robot. The mat is an inductive charging port 70 and contains an inside transmitter coil used for inductive charging. Each robot has an inductive charging plate 71 that has another coil (receiving antenna) on its underside, that when positioned above the charging port 70 enables wireless charging. The minimum distance required between the robot underside and the floor mat is approximately 12" but this may change as technology advances. Dimensions and specifications will be determined as costs and physical constraints are considered.

Methane

Another alternative, or additional source of energy, is methane. Methane capture and use provides a unique opportunity. Methane is produced by different processes at farm environments. For example, enteric production in all animals, fore stomach production in ruminants, and general decay processes of organic waste (farm waste or animal waste) are some of the available sources of methane, just to mention a few. The control company can offer the opportunity to all sites with methane product, to capture and use the product for their own robots and additionally, to sell the methane to other users, including other control company robot owners or leasing customers.

When using methane to recharge the bots it is ideal for each bot to have its own compact fuel cell 6 that converts the methane to electric power to drive the bat. The compact fuel cell is tuned to methane fuel as hydrogen source. It is a hybrid energy source (fuel cell +Li-Ion battery kept warm by the fuel cell heat byproduct). Bots featuring and using the fueling port 3 have an autonomous navigation and docking system that guides each bot to the fueling port 3 for refueling. There are many different ways to achieve this, including an autonomous navigation software solution that identifies the fueling port 3 using visual cues that are part of the station itself. The operator has the ability to teach the robot the location of the fueling port 3, through a "home tour" approach, so the robot can localize and navigate to the station. In addition to visual cues, a wireless emitter can also be used, so the robot can identify and approach the fueling port 3 with precision, even in inclement weather.

The mechanism of refueling will obviously depend on the type of fuel used. If there is electricity present, such as from the grid or a solar panel 80 supplied power to the inductive charging port 70 then the induction charging system could be utilized. However, as described above, methane could be used, or it could even be a combination of both electricity and methane. When using the charging port 3 bots have an alert system that notifies the bot that it is low on fuel and that it needs to go back and refuel. The bots could also use regenerative braking to provide additional charge while in use.

If methane is used then the control company will provide controls and services in addition to those listed above. These services include but are not limited to offering equipment to capture and store the methane. This equipment could be sold outright to the customer or the control company could lease the equipment to the customer. Also, the control company could provide transportation on site or to off-site locations for stored methane when capacity is reached. Methane delivery could also be a provided service where the control company delivers methane to other customers that use methane fuel powered robots and devices. In many of these situations both parties benefit.

There are some drawbacks that need to be overcome but with continued investment and technology advancement these constraints will be removed. However, at present there are obstacles to overcome, specifically, cost, duty cycle duration, life cycle and the maintenance interval.

While the present disclosure has been described as having certain designs, the various disclosed embodiments may be further modified within the scope of the disclosure. This application is therefore intended to cover any variations, uses, or adaptations of the disclosed embodiments using its general principles. Further, this application is intended to cover such departures from the present disclosure as come within known or customary practice in the relevant art.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention claimed is:

1. A system to control depredators and predators comprising:

a configurable ground utility robot comprising:
an all-terrain autonomous mobile apparatus that can navigate in both structured and unstructured environments;
a processor;
at least one sensor that communicates with said processor;
where said at least one sensor receives data from the environment;

at least one computer program that performs at least the following functions:

receives and interprets data from said at least one sensor;

processor formulates an action in response to said received data;

generates a command to control said mobile apparatus in response to said environment data;

at least one control device attachable to said ground utility robot;

said control device is a physical apparatus that threatens or scares the depredators or predators using movement of said control device; where said at least one control device performs an action in response to said command designed to elicit a sensory reaction in said depredator or said predator; and the ground utility robot and control device constantly move and roam around the environment to increase response efficacy in depredators or predators.

2. The depredator and predator control system of claim 1 where said control device is powered by said ground utility robot and said ground utility robot is powered by renewable energy.

3. The depredator and predator control system of claim 2 where said control device is controlled by said ground utility robot.

4. The depredator and predator control system of claim 1 where said control device is self-powered.

5. The depredator and predator control system of claim 1, where said control device is a sky puppet and where said sky puppet comprises:

a motor;

a fan; and a windsock.

6. The depredator and predator control system of claim 5, where said sky puppet further comprises:

a trailer that houses said sky puppet; and where said trailer is attachable to said ground utility robot.

7. The depredator and predator control system of claim 1, said control device comprises:

a windmill having one or more blades.

8. The windmill of claim 7 further comprising:

a motor; and where wind or wind and said motor turn said one or more windmill blades.

9. A system to control depredators and predators comprising:

a configurable ground utility robot comprising:

an all-terrain autonomous mobile apparatus;

a processor;

at least one sensor that communicates with said processor; where said at least one sensor receives data from the environment and from depredators and predators;

at least one computer program that performs at least the following functions:

receives and interprets data from said at least one sensor;

processor formulates an action in response to said received data;

generates a command to control said mobile apparatus in response to said environment data and from said depredator and predator data; and learns to react to different situations from past acquired data;

a control device attachable to said ground utility robot; where the control device is a sky puppet; and said control device performs actions designed to elicit a sensory reaction in said depredator or said predator.

10. The system to control depredators and predators of claim 9 the system that learns from the past acquired data and uses that learning to react differently to depredators and predators.

11. The system to control depredators and predators of claim 9, where learned actions include changing patterns of movement to more effectively control depredators and predators in the future.

12. The system to control depredators and predators of claim 9 where the control device is the sky puppet and one or more other control devices.

13. The system to control depredators and predators of claim 9 where the control devices are powered by the ground utility robot and the ground utility robot is powered by renewable energy.

14. The system to control depredators and predators of claim 9 where the control devices are self-powered.

15. A system to control depredators and predators comprising:

a configurable ground utility robot comprising:

an all-terrain autonomous mobile apparatus;

a processor;

at least one sensor that communicates with said processor;

where said at least one sensor receives data from the environment;

at least one computer program that performs at least the following functions:

receives and interprets data from said at least one sensor;

processor formulates an action in response to said received data;

generates a command to control said mobile apparatus in response to said environment data;

a physical apparatus attachable to said ground utility robot; where said physical apparatus performs an action in response to said command designed to elicit a sensory reaction in said depredator or said predator.

* * * * *